US010759227B2

(12) United States Patent
Rossiello et al.

(10) Patent No.: US 10,759,227 B2
(45) Date of Patent: Sep. 1, 2020

(54) SALTS WITH ANTI-DEGRADATION ACTIVITY, ELASTOMERIC COMPOSITIONS FOR TIRES AND TIRES COMPRISING THE SAME

(71) Applicant: Pirelli Tyre S.p.A., Milan (IT)

(72) Inventors: Luigia Rossiello, Milan (IT); Thomas Hanel, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 26 days.

(21) Appl. No.: 16/079,250

(22) PCT Filed: Mar. 1, 2017

(86) PCT No.: PCT/IB2017/051197

§ 371 (c)(1),
(2) Date: Aug. 23, 2018

(87) PCT Pub. No.: WO2017/149472

PCT Pub. Date: Sep. 8, 2017

(65) Prior Publication Data

US 2019/0047326 A1 Feb. 14, 2019

(30) Foreign Application Priority Data

Mar. 4, 2016 (IT) ........................ 102016000023177

(51) Int. Cl.

| | |
|---|---|
| ***B60C 1/00*** | (2006.01) |
| ***C08K 5/09*** | (2006.01) |
| ***C08K 5/17*** | (2006.01) |
| ***C08L 7/00*** | (2006.01) |
| ***C08K 5/19*** | (2006.01) |
| ***C08K 5/18*** | (2006.01) |
| ***C08K 3/013*** | (2018.01) |
| ***C08K 5/00*** | (2006.01) |

(52) U.S. Cl.

CPC .............. *B60C 1/0016* (2013.01); *B60C 1/00* (2013.01); *B60C 1/0025* (2013.01); *C08K 3/013* (2018.01); *C08K 5/0025* (2013.01); *C08K 5/09* (2013.01); *C08K 5/17* (2013.01); *C08K 5/18* (2013.01); *C08K 5/19* (2013.01); *C08L 7/00* (2013.01); *B60C 2200/04* (2013.01); *B60C 2200/06* (2013.01); *B60C 2200/10* (2013.01)

(58) Field of Classification Search

CPC . C08K 5/09; C08K 3/013; C08K 5/17; C08K 5/19; C08K 5/0025; B60C 1/0025; B60C 1/0016; C08L 7/00

USPC .......................................................... 523/152

See application file for complete search history.

(56) References Cited

U.S. PATENT DOCUMENTS

| | | | |
|---|---|---|---|
| 4,550,142 A | 10/1985 | Akita et al. | |
| 4,742,124 A | 5/1988 | Tsutsumi et al. | |
| 6,598,632 B1 | 7/2003 | Moreland et al. | |
| 2011/0034359 A1* | 2/2011 | Rabbat ................. | C10M 141/06 508/517 |
| 2013/0102714 A1 | 4/2013 | Recker et al. | |
| 2015/0344679 A1* | 12/2015 | Balnis ...................... | C08K 5/47 152/450 |

FOREIGN PATENT DOCUMENTS

| | | |
|---|---|---|
| EP | 0 451 604 A2 | 10/1991 |
| EP | 1 874 860 | 1/2008 |
| EP | 2 424 738 | 3/2012 |
| EP | 2 629 987 | 8/2013 |
| GB | 887173 A | 1/1962 |
| RU | 2 570 045 C2 | 12/2015 |
| WO | WO 01/68761 A1 | 9/2001 |
| WO | WO 2006/114124 A1 | 11/2006 |
| WO | WO 2010/124977 A1 | 11/2010 |
| WO | WO 2015/001937 A1 | 1/2015 |

OTHER PUBLICATIONS

International Search Report form the European Patent Office in corresponding International Application No. PCT/IB2017/051197 dated Aug. 18, 2017.

Written Opinion of the International Searching Authority from the European Patent Office in corresponding International Application No. PCT/IB2017/051197 dated Aug. 18, 2017.

Huntink, N.M. et al., "A Novel Slow Release Antidegradant for the Rubber Industry", KGK Kautschuk Gummi Kunststoffe 56, Jun. 2003, pp. 310-315.

Huntink, "Durability of Rubber Products", Twente University Press, 2003, pp. 1-207, http://doc.utwente.nl/40689/1/thesis_Huntink.pdf.

English Translation of Russian Official Action and Search Report in Application No. 2018133849/05(055643) dated May 12, 2020.

* cited by examiner

*Primary Examiner* — Doris L Lee

(74) *Attorney, Agent, or Firm* — Finnegan, Henderson, Farabow, Garrett & Dunner, L.L.P.

(57) ABSTRACT

The present invention relates to new antioxidant and antiozonant elastomeric compositions for tyres, characterized by reduced volatility of the active compounds, improved processability and environmental sustainability, increased anti-degradation efficacy and improved surface appearance. In particular, the elastomeric compositions of the inventions comprise Salts formed by acids AC of formula (I) and amines AM of formula (II) The elastomeric compositions of the inventions are particularly suitable for the manufacture of tyre components such as sidewalls, treads and anti-abrasive layer, components that in the tyre are particularly subject to wear due to the combination of the degrading action of ozone and mechanical stresses.

20 Claims, 6 Drawing Sheets

SALTS WITH ANTI-DEGRADATION ACTIVITY, ELASTOMERIC COMPOSITIONS FOR TIRES AND TIRES COMPRISING THE SAME

This application is a section 371 national phase application based on International Application No. PCT/IB2017/051197, filed Mar. 1, 2017, and claims the priority of Italian Patent Application No. 102016000023177, filed Mar. 4, 2016; each application is incorporated herein by reference.

FIELD OF THE INVENTION

The present invention relates to salts of anti-degradation compounds, to elastomeric compositions for tyres, to tyre components and tyres comprising them, characterized by reduced volatility of the active compounds, improved processability and environmental sustainability, increased anti-degradation efficacy and improved surface appearance.

PRIOR ART

The elastomeric compositions, in particular compositions for tyres comprising diene elastomeric polymers, are sensitive to the action of oxygen and ozone and can undergo significant degradation phenomena.

The degradation caused by oxygen proceeds through different mechanisms than that caused by ozone and gives rise to different alterations. In fact, oxygen acts also within the material, causing hardening or softening of the same, according to the type of the base elastomer, while ozone mainly reacts on the surface, causing discoloration and, when the material is subject to prolonged strain, formation of cracks, potentially dangerous and certainly not reassuring for the user.

The phenomenon is particularly marked at the sidewalls of the tyre, where the material is more stressed, however it also occurs on the tread and generally on the exposed surfaces.

In order to minimise these effects, protective antiozonant compounds are usually added to elastomeric compositions for tyres, particularly aromatic amines derived from p-phenylenediamine, such as N-(1,3-dimethylbutyl)-N'-phenyl-p-phenylenediamine (6PPD), well established in the field.

Usually, in order to provide additional protection, waxes are also added to the elastomeric compositions which act by forming a surface coating of the materials. The combination of antiozonants and waxes has proved effective to minimise cracking in the surface of the sidewalls. In particular, waxes tend to migrate rapidly on the surface of the sidewalls and form a protective film, while antiozonants more slowly so as to provide long-lasting protection.

As a result, waxes provide a static protection during transport and storage of tyres, while antiozonants provide dynamic protection during the use of tyre mounted on a vehicle wheel, in particular against fatigue resulting from the cyclic alternation of compression and release of the sidewalls during normal use. Static and dynamic protection can be assessed and differentiated by subjecting a sample to a static and dynamic ozone test, respectively.

In addition, in order to prevent damage resulting from deep action of oxygen, it is standard practice to also include antioxidant substances in the elastomeric compositions.

Unfortunately, protective agents in general, and in particular those derived from p-phenylenediamine, such as 6PPD, effective in preventing degradation phenomena, have some drawbacks.

First, they are generally rather volatile amines. In the hot incorporation in the elastomeric material—despite being careful to add them in the mixing steps at lower temperatures, which in any case will be typically around at least 130° C.—significant amounts are inevitably lost by evaporation. The phenomenon obviously is even more pronounced if the mixing process includes one or more vacuum steps.

The loss of significant amounts, in the order of 30-40%, and variables of 6PPD involves a waste of reagent, which must be added in excess to ensure sufficient protective activity in the final composition, low reproducibility of the process, environmental pollution and potential toxicity for the operators.

Antiozonants and waxes can migrate not uniformly or excessively to the surface of the elastomeric material—both during vulcanisation and subsequently—causing yellow-brown colouring and the formation of whitish spots, particularly evident in the sidewalls of tyres based on isoprene and carbon black.

The colour variation and the formation of spots can be a serious problem from a commercial perspective since the appearance of the sidewalls, together with the design of the tread, are a key element that can affect the buyer's choice when purchasing new tyres.

Some studies have been conducted in the field to solve the above problems, in particular prevent the appearance of spots due to the uneven surfacing of p-phenylenediamine derivatives, but these studies have not solved the problems related to the excessive volatility of these compounds.

To this end, some patents describe the addition of particular polymers to the elastomeric compounds.

For example, U.S. Pat. No. 6,598,632 on behalf of Michelin describes an elastomeric composition for tyres comprising a polymer of general formula R—O—$(C_nH_{2n}O)_x$—H (e.g. PEG) useful for preventing the formation of surface stains caused by the antiozonant agent.

Patent EP1874860B1, on behalf of the Applicant, reports the use of modified polycarboxylates in elastomeric compositions—in addition to or in replacement of antiozonants and traditional waxes—to prevent the appearance of colours and spots on the surface and at the same time increase the ozone and fatigue resistance. The modified polycarboxylates described herein are copolymers of unsaturated carboxylic acids and unsaturated monomers having at least one polyoxyalkylene side chain.

Patent application WO2010124977, on behalf of the Applicant, describes an antiozonant composition for tyres comprising polyethylene glycol (PEG) and minimal amounts of antiozonants, especially 6PPD.

Some other studies are also known from the literature which are aimed at increasing the duration of the antiozonant action of 6PPD according to a different approach, in particular through the formation of adducts with weak acids, preferably with stearic acid.

The international patent application WO0168761 on behalf of Flexsys B.V. describes cross-linkable elastomeric composition comprising as protective agents adducts of N,N'-disubstituted-p-phenylenediamines, with weak organic acids, in particular with $C_2$-$C_{24}$ alkyl monocarboxylic or dicarboxylic acids, preferably with $C_{12}$-$C_{20}$ fatty acids. The only adduct estimated in fatigue resistance and ozone resistance tests on elastomeric compositions is stearate 6PPD.

The article entitled "*A Novel Slow Release Antidegradant for the Rubber Industry*" (KGK Kautschuk Gummi Kunststoffe 56. Jahrgang, Nr. June 2003, page 310-315) describes a comparative study on migration and efficacy of 6PPD, IPPD (N-isopropyl-N'-phenyl-p-phenylenediamine) and the adduct 6PPD—stearic acid as antiozonants. This adduct is said to migrate more slowly than 6PPD, functioning as a slow-release agent and thus protecting the elastomeric material from ozone for a longer time. In addition, the adduct seems to ensure a better appearance to the tyre sidewalls.

The thesis entitled "*Durability of rubber products*" (Publisher: Twente University Press, P.O. Box 217, 7500 AE Enschede, The Netherlands, © N.M. Huntink, Zutphen, 2003, ISBN 90 365 1946 2, http://doc.utwente.n1/40689/1/thesis_Huntink.pdf) describes the synthesis, characterisation and evaluation of long-life anti-degradation agents (Chapters 3, 4 and 5). In particular, the thesis describes the preparation of some 6PPD abducts or salts with acetic, heptanoic, stearic, benzoic, succinic, adipic, fumaric, maleic, tartaric, phthalic and methanesulfonic acid (see table 3.1 on page 57). Among these, the adduct with stearic acid appears to be the best both for the prolonged anti-degradation activity and for the appearance of the materials of the sidewalls of the tyres incorporating them.

SUMMARY OF THE INVENTION

The applicant has set itself the goal of improving the performance of p-phenylenediamine derivatives as protective agents for tyres, in particular of solving the problems related to their excessive volatility, the irregular surfacing and the formation of spots and colors while maintaining their excellent protective properties against oxygen and ozone.

The new class of protective agents identified in these studies, derived from the salification of p-phenylenediamines with particular acids, not only reached the expectations for the aspects mentioned above but also showed an unexpected increase in antioxidant properties.

Therefore, a first aspect of the invention is a salt S comprising:

i) at least one acid AC of formula (I)

$$R—(OC_mH_{2m})_w(OC_nH_{2n})_z—X \quad (I)$$

wherein

- R is selected from H, optionally substituted linear or branched $C_1$-$C_{22}$ alkyl, $C_6$-$C_{20}$ aryl or aralkyl and mixtures thereof,
- groups —$(OC_mH_{2m})_w$ and $(OC_nH_{2n})_z$ are linear or branched polyoxyalkylene groups, wherein m and n independently are an integer of from 2 to 5 and w and z an integer of from 0 to 20, the sum of which is between 1 and 40, and mixtures thereof,
- X is a group selected from —O—R1-COOH, —S—R1-COOH, —NR2-R1-COOH, —P(═O)OR3OR4, —O—P(═O)OR3OR4, —O—$PO_3$H, —O—R1-P(═O)OR3OR4, wherein R1 is an optionally substituted linear or branched $C_1$-$C_4$ alkylene, $C_6$-$C_{20}$ aryl or aralkyl; R2 is selected from H, —R and —C(═O)R, wherein R is a group as defined above; at least one of R3 and R4 is H and the other may be H or R—$(OC_mH_{2m})_w(OC_nH_{2n})_z$— as defined above; and II) at least one amine AM of formula (II)

$$R_5—NH—C_6H_4—NH—R_6 \quad (II)$$

wherein R5 and R6 are independently selected from H, optionally substituted saturated or unsaturated linear or branched $C_2$-$C_{22}$ alkyl, $C_4$-$C_{10}$ cycloalkyl, $C_6$-$C_{20}$ aryl and aralkyl, at least one of R5 and R6 being other than H.

A second aspect of the invention is an elastomeric composition for tyre comprising at least a) 100 phr of at least one diene elastomeric polymer,
b) at least one salt S as defined above, in an amount comprising at least 0.1 phr of said amine AM (II),
c) at least 1 phr of a reinforcement filler and, optionally,
d) at least 0.5 phr of a vulcanising agent.

A third aspect of the invention is a tyre component comprising an elastomeric composition as defined above or an elastomeric composition obtained by at least partial vulcanisation of an elastomeric composition as defined above.

A fourth aspect of the invention is a tyre for vehicle wheels comprising at least one component comprising an elastomeric composition obtained by vulcanising an elastomeric composition as defined above.

DETAILED DESCRIPTION

Figure 1:
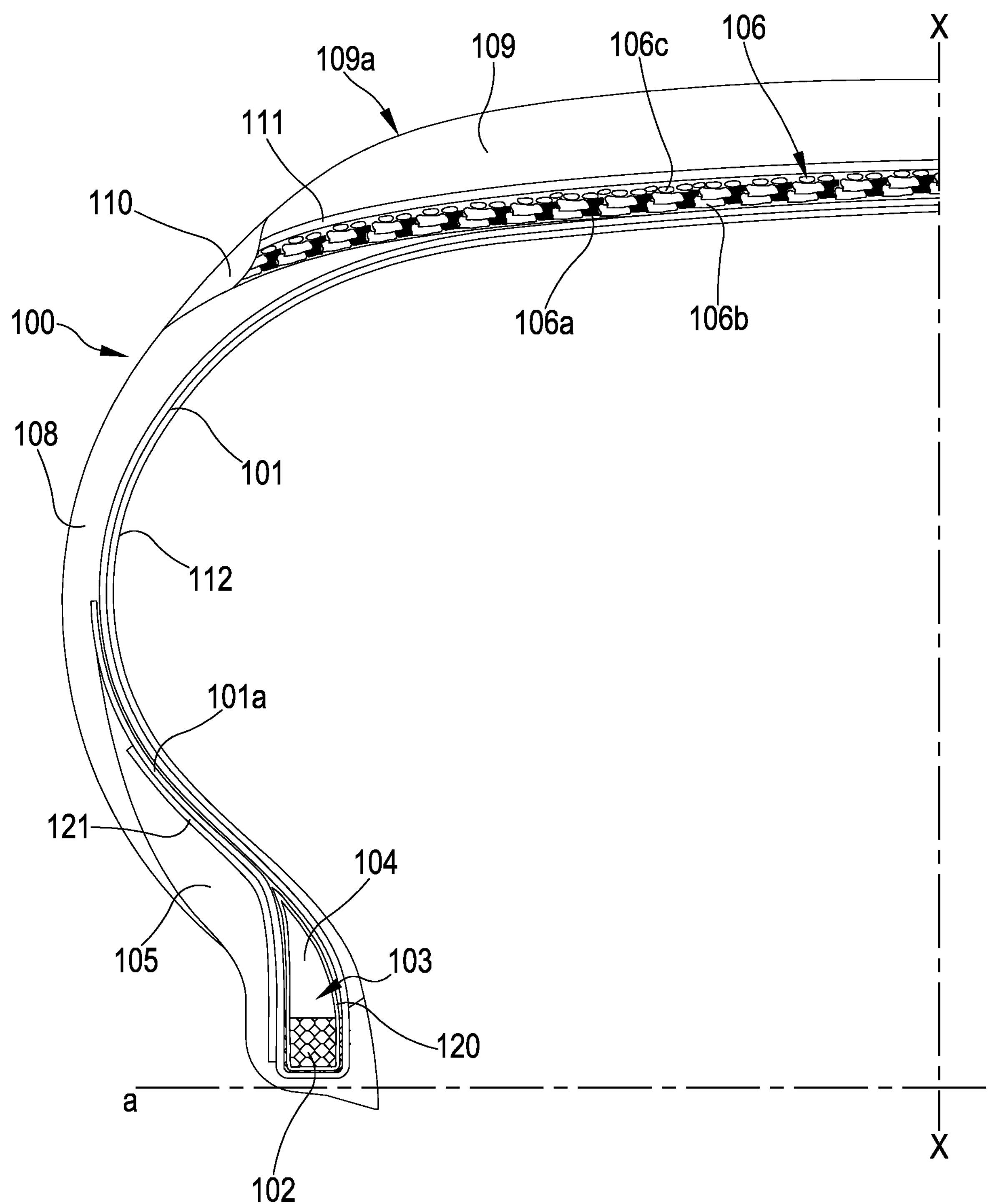
FIG. 1 shows a cross-sectional view of a portion of a tyre made according to an embodiment of the present invention.

For the purposes of the present description and of the following claims, the term "phr" (parts per hundreds of rubber) means the parts by weight of a given component of the elastomeric composition by 100 parts by weight of the diene elastomeric polymer.

Unless otherwise indicated, all the percentages are expressed as percentages by weight.

The salts, the cross-linkable elastomeric compositions, the tyre components and the tyres comprising the same according to the present invention are characterised by one or more of the following preferred aspects, taken alone or in combination with one another.

A first aspect of the present invention is a salt S as defined above, comprising at least one acid AC (I) and one amine AM (II).

Salt S is obtainable by salification of acid AC (I) with amine AM (II).

Preferably, acid AC is an acid AC of formula $$R—(OC_mH_{2m})_w(OC_nH_{2n})_z—X \quad (I)$$

wherein:

R is selected from preferably unsubstituted linear or branched $C_4$-$C_{18}$ alkyl, $C_6$-$C_{12}$ aryl or aralkyl, and mixtures thereof, and/or m and n are independently an integer from 2 to 4, and/or w and z independently are an integer of from 0 to 10, the sum of which is between 1 and 10, and/or X is a group selected from —O—R1-COOH, wherein R1 is a $C_1$-$C_2$ alkylene, preferably unsubstituted, —O—P(═O)OR3OR4 and —O—$PO_3$H, wherein at least one of R3 and R4 is H and the other may be H or R—$(OC_mH_{2m})_w(OC_nH_{2n})_{z}$-, wherein R, m, n, w and z are as defined herein, and mixtures thereof.

Preferably, salt S comprises at least one acid AC of formula (I)

$$R—(OC_mH_{2m})_w(OC_nH_{2n})_z—X \quad (I)$$

wherein

R is selected from linear or branched C6-C14 alkyls, preferably unsubstituted, and mixtures thereof, and/or m is 2, w is an integer of from 1 to 10, and z is 0, and/or X is a group —O—R1-COOH, wherein R1 is an unsubstituted $C_1$-$C_2$ alkylene and mixtures thereof.

Preferably, acid AC is an acid AC of formula $$R—(OC_mH_{2m})_w(OC_nH_{2n})_z—X \quad (I)$$

wherein:

R is selected from preferably unsubstituted linear or branched $C_4$-$C_{18}$ alkyl, $C_6$-$C_{12}$ aryl or aralkyl, and mixtures thereof, m and n are independently an integer from 2 to 4, w and z independently are an integer of from 0 to 10, the sum of which is between 1 and 10, and X is a group selected from —O—R1-COOH, wherein R1 is a $C_1$-$C_2$ alkylene, preferably unsubstituted, —O—P(═O)OR3OR4 and —O—$PO_3$H, wherein at least one of R3 and R4 is H and the other may be H or R—$(OC_mH_{2m})_w(OC_nH_{2n})_{z}$-, wherein R, m, n, w and z are as defined herein, and mixtures thereof.

Preferably, salt S comprises at least one acid AC of formula (I)

$$R—(OC_mH_{2m})_w(OC_nH_{2n})_z—X \quad (I)$$

wherein

R is selected from linear or branched $C_6$-$C_{14}$ alkyls, preferably unsubstituted, and mixtures thereof, m is 2, w is an integer of from 1 to 10, and z is 0, and X is a group —O—R1-COOH, wherein R1 is an unsubstituted $C_1$-$C_2$ alkylene and mixtures thereof. Preferably, salt S comprises two or more acids AC of formula S (I) as defined above.

Generally, mixtures of acids AC of formula (i) are formed in synthesis reactions, for example as described in: Surfactants: Chemistry, Interfacial Properties, Applications, Vol. 13 of Studies in Interface Science (D. Möbius, R. Miller, V. B. Fainerman, Elsevier, 2001), pages 40 and 41—and as such are sold.

Typical preparation reactions are, for example:

a modified Williamson reaction, in which alcohols of formula $R—(OC_mH_{2m})_w(OC_nH_{2n})_zOH$ are reacted with an excess of NaOH and chlorine-substituted carboxylic acids (e.g. chloroacetic acid) and subsequent acidification, a bland air oxidation of alcohols of formula $R—(OC_mH_{2m})_w(OC_nH_{2n})_zOH$ under alkaline conditions and Pd/Pt catalyst and subsequent acidification. In the case of alcohol ethoxylates, the end group —$OCH_2CH_2OH$ is oxidized to $OCH_2COOH$.

In such mixtures, acids of formula (I) are generally characterised by average molecular weight values and possibly mean values of recurrence of monomers in the polyoxyalkylene chain (see for example the acids shown in Table 1).

Examples of linear polyoxyalkylene groups —$(OC_mH_{2m})_w$ $(OC_nH_{2n})_z$—are polyethylene glycols PEG, polypropylen glycols PPG, polytrimethylen glycols, polytetramethylene glycols PTMG.

Optionally, groups R and R1 can in turn be substituted with one or more alkyls as defined above, acyls RC(═O)—, acyl esters ROC(═O)— and RC(═O)O—, halogens, amide groups RC(═O)NH— and RNHC(═O)—, polyoxyalkylene, —SH, —SR, —OH and —OR groups, said substituents preferably being, in turn, unsubstituted.

Preferably, group R is unsubstituted.

Preferably, group R1 is unsubstituted.

Preferably, both groups R and R1 are unsubstituted.

In order to form a sufficiently stable salt, preferably, acid AC has a value of pKa of less than 5 or less than 4.5, more preferably less than 4.0 or less than 3.5 or less than 3.0.

Preferably, the pKa of acid AC is of between 4.0 and 1.5, more preferably between 4.0 and 2.5.

Moreover, the Applicant noted that in order to form a salt S with the desired surfacing properties, preferably acid AC should have an amphiphile character, in particular comprise a lipophilic portion (R) and a hydrophilic portion (polyoxyalkylene chain) of such lengths as to impart poor affinity for the elastomeric matrix to acid AC and salt S thereof, allowing an easy and uniform surfacing. This affinity could be expressed, for example, in terms of HLB value (hydrophilic-lipophilic balance) of acid AC. Depending on the type of elastomeric compound, for example more lipophilic in the case of matrices containing carbon black, or more hydrophilic, if comprising silica-based white fillers, acids with lower or higher HLB values may be preferred.

For example, in the case of matrices comprising carbon black, the Applicant has observed excellent surfacing results with acids of the Akypo series having an HLB preferably of at least 5, at least 8, at least 10, preferably at least 13, at least 14, at least 16.

Preferably, in the case of elastomeric compositions comprising carbon black, acid AC has a pKa of less than 4.0 and an HLB of at least 10, more preferably of at least 14.

Particularly preferred are salts comprising at least one acid of formula (I), wherein m=2, z=0, X═O—$CH_2$COOH, R is an unsubstituted $C_4$-$C_{14}$ alkyl and w is an integer of from 1 to 10 and mixtures thereof.

Examples of these preferred acids are acids of formula III $$R—(OCH_2CH_2)w—O—CH_2—COOH \quad (III)$$

For example, those of the Akypo series (polyoxyalkylene glycol acids) marketed by Kao, shown in the following Table 1, as described by the supplier:

TABLE 1

| Name | R | w | HLB |
|---|---|---|---|
| Akypo ® LF 1 | C8 | 5 | 13 |
| Akypo ® LF 2 | C8 | 8 | 16 |
| Akypo ® LF 4 | C6/C8 | 3 + 8 | 10 |

TABLE 1-continued

| Name | R | w | HLB |
|---|---|---|---|
| Akypo ® LF 6 | C4/C8 | 1 + 8 | 14 |
| Akypo ® RLM 25 | C12/C14 | 2.5* | |
| Akypo ® RLM 45 CA | C12/C14 | 4.5* | |
| Akypo ® RLM 100 | C12/C14 | 10 | |

*average value

Advantageously, acids of the Akypo series do not exhibit particular safety or toxicity issues, being already commonly used as detergents.

Particularly preferred are the salts formed by the acid called Akypo RLM 45 CA or by the acid Akypo LF 2, more preferably Akypo RLM 45 CA.

Alternatively, acid AC of formula (I) may be preferably a phosphate of formula (IVa or IVb) and mixtures thereof

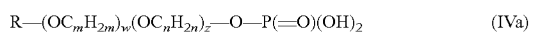

$$R—(OC_mH_{2m})_w(OC_nH_{2n})_z—O—P(=O)(OH)_2 \quad (IVa)$$

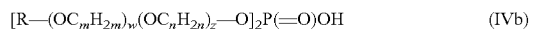

$$[R—(OC_mH_{2m})_w(OC_nH_{2n})_z—O]_2P(=O)OH \quad (IVb)$$

wherein variables R, m, n, w and z can take the meanings shown above in defining formula (I).

Examples of phosphates of formula IVa and IVb are the acids of formula (Va or Vb)

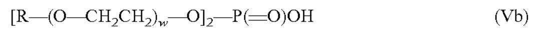

$$R—(O—CH_2CH_2)_w—O—P(=O)(OH)_2 \quad (Va)$$

$$[R—(O—CH_2CH_2)_w—O]_2—P(=O)OH \quad (Vb)$$

wherein m=2, z=0, w from 2 to 6, usually available on the market as a mixture, of the Danox series, in particular DANOX FL 1214/16, wherein w=4, R=C12-C14 (CAS RN=68511-37-5), of the Fosfadet series, in particular FOSFODET T-17 w=5 R=C16-C18 (CAS RN=91254-26-1), marketed by Kao, or marketed by Rhodia (Solvay) as Lubrhophos® series, in particular Lubrophos LP/700 E w=6,5, R=phenyl (CAS RN: 39464-70-5)

Alternatively, acid AC of formula (I) may be a phosphonate of formula (VIa) or (VIb) and mixtures thereof

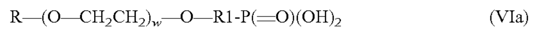

$$R—(O—CH_2CH_2)_w—O—R1\text{-}P(=O)(OH)_2 \quad (VIa)$$

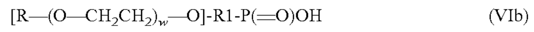

$$[R—(O—CH_2CH_2)_w—O]\text{-}R1\text{-}P(=O)OH \quad (VIb)$$

wherein variables R, R1 and w can take the meanings shown above in defining formula (I).

If acid AC is of formula (I), wherein X=—O—R1-COOH, preferably salt S comprises acid AC in a molar ratio of between 0.7:1 and 1:1, more preferably around 1:1 with respect to amine AM.

In the case of an acid AC of formula (I), wherein X is O—R1-COOH, —S—R1-COOH or —NR2-R1-COOH, or acids of formula IVb, Vb or VIb, salt S preferably comprises acid AC in a molar ratio of between 0.7:1 and 1:1, more preferably around 1:1 with respect to amine AM.

In the case of acids AC of formula IVa, Va or VIa, salt S preferably comprises acid AC in a molar ratio generally of between 0.3:1 and 0.5:1, preferably around 0.5:1 with respect to amine AM.

Salt S comprised in the elastomeric composition of the present invention comprises at least one amine AM of formula (II):

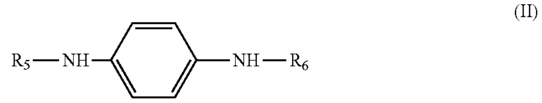

wherein preferably

R5 and R6 are independently selected from H, saturated acyclic linear or branched $C_3$-$C_8$ alkyl, $C_5$-$C_7$ cycloalkyl, $C_6$-$C_{10}$ aryl or aralkyl, at least one of R5 and R6 being other than H, preferably both being other than H.

Preferably, R5 and R6 are independently selected from H, —$(CH_2)_2CH_3$, —$CH(CH_3)CH_3$, —$(CH_2)_3CH_3$, —$CH(CH_3)$—$CH_2CH_3$, —$CH_2CH(CH_3)CH_3$, —$(CH_2)_4CH_3$, —$(CH_2)_5CH_3$, cyclopentyl, cyclohexyl, phenyl, tolyl, benzyl, $(CH_2)6CH_3$, —$CH(C_2H_5)$—$CH_2$—$CH(CH_3)CH_3$, —$CH(CH_3)$—$(CH_2)_2$—$CH(CH_3)CH_3$, —$CH(C_2H_5)$—$CH_2$—$CH(CH_3)CH2CH_3$, —$CH(CH_3)$—$(CH_2)_5$—$CH_3$, beta naphthyl.

Preferably, amine AM of formula (II) is N,N'-disubstituted (R5 and R6 other than H). Preferably, amine AM is an amine of formula (II), wherein both R5 and R6 are other than H, more preferably both R5 and R6 are other than H and one of R5 and R6 is phenyl, even more preferably R5 is phenyl and R6 is 1,3-dimethyl-butyl.

Preferably, the N,N'-disubstituted amine AM of formula (II) is selected from N-isopropyl-N'-phenyl-p-phenylenediamine (IPPD), N-(1,3-dimethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, N,N'-Di-sec-butyl-p-phenylenediamine (44PD), N-phenyl-N'-cyclohexyl-p-phenylenediamine, N-phenyl-N'-1-methylheptyl-p-phenylenediamine, more preferably it is N-(1,3-dimethyl-butyl)-N'-phenyl-p-phenylenediamine (6PPD).

Preferably, amine AM of formula (II) is monosubstituted (R5 or R6=H), more preferably one of R5 and R6 is H and the other is phenyl, as in 4-aminodiphenylamine (4-ADPA).

Advantageously, 4-ADPA, by reaction with atmospheric oxygen and ozone, does not release irritating by-products such as volatile alcohols and ketones, as may occur with disubstituted diamines, for example with 6PPD which can release methyl-isobutyl ketone (MIBK).

Preferably, salt S may comprise two or more amines of formula (II).

Particularly preferred salts according to the invention are composed of equimolar amounts of an acid AC of the Akypo series (formula (I), wherein m=2, z=0, X=O—CH2-COOH, R is an unsubstituted C4-C14 alkyl and w is an integer of from 1 to 10, and mixtures thereof, as defined above and an amine AM of formula (II), preferably of 6PPD.

Salt S of the present invention can be prepared by reaction of acid AC (I) and amine AM (II) (acid-base reaction) brought into contact, under stirring, optionally in suspension or solution in an optional solvent.

Advantageously, the salt can be prepared in the absence of solvent starting from acid AC and amine AM, the acid itself also serving as a solvent, under stirring, at a temperature generally of between 20 and 100° C. for 10 min. to 20 hours, preferably in an inert atmosphere, and the resulting crude salt used as is without any special processing.

A second aspect of the present invention is an elastomeric composition for tyre as defined above.

The elastomeric composition according to the invention comprises 100 phr of at least one diene elastomeric polymer, or optionally multiple diene elastomeric polymers in a mixture.

Preferably, the diene elastomeric polymer is selected from 1,4-polyisoprene (natural or synthetic IR, preferably cis-1,4-polyisoprene, preferably natural rubber NR), 3,4-polyisoprene, polybutadiene (BR), in particular polybutadiene with a high content of 1,4-cis, optionally halogenated isoprene/isobutene copolymers, 1,3-butadiene/acrylonitrile copolymers, styrene/1,3-butadiene copolymers (SBR), styrene/isoprene/1,3-butadiene copolymers, styrene/1,3-butadiene/acrylonitrile copolymers, or mixtures thereof.

Preferably, the elastomeric composition of the present invention comprises:

(a1) at least one polyisoprene rubber in an amount of at least 20 phr, preferably from 30 phr to 90 phr, and (a2) at least one diene elastomeric polymer other than polyisoprene rubber (a1) in an amount of less than or equal to 80 phr, preferably from 10 phr to 70 phr.

According to a preferred embodiment, the polyisoprene rubber (a1) may be selected from natural or synthetic polyisoprene rubber, preferably from natural or synthetic cis-1-4-polyisoprene rubber, synthetic 3,4-polyisoprene rubber, more preferably from natural cis-1,4-polyisoprene rubber (natural rubber). Preferably, said polyisoprene rubber is present in the above elastomeric composition in an amount of from 30 phr to 60 phr, more preferably from 30 phr to 50 phr.

According to a preferred embodiment, the diene elastomeric polymer (a2) (other than polyisoprene rubber (a1) can be selected from among those commonly used in elastomeric compositions cross-linkable with sulphur, which are particularly suitable for the production of tyres, or from elastomeric polymers or copolymers having an unsaturated chain having a glass transition temperature (Tg) generally below 20° C., preferably within the range of −110° C. to 0° C. These polymers or copolymers can be of natural origin or can be obtained by polymerisation in solution, polymerisation in emulsion or polymerisation in gas phase of one or more conjugated diolefins, optionally mixed with at least one comonomer selected from monovinylarenes and/or polar comonomers in an amount not exceeding 60% by weight.

Conjugated diolefins generally contain from 4 to 12, preferably from 4 to 8 carbon atoms and may be selected, for example, from the group comprising: 1,3-butadiene, 2,3-dimethyl-1,3-butadiene, 1,3-pentadiene, 1,3-hexadiene, 3-butyl-1,3-octadiene, 2-phenyl-1,3-butadiene or mixtures thereof. 1,3-butadiene is particularly preferred. The monovinylarenes that can be optionally used as comonomers generally contain from 8 to 20, preferably from 8 to 12 carbon atoms and can be selected, for example, from: styrene: 1-vinylnaphthalene; 2-vinylnaphthalene; various alkyl, cycloalkyl, aryl, alkylaryl or arylalkyl derivatives of styrene such as α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, or mixtures thereof. Styrene is particularly preferred.

Polar comonomers that may optionally be used can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile or mixtures thereof.

Preferably, the diene elastomeric polymer (a2) can be selected, for example, from: polybutadiene (in particular polybutadiene with a high content 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof. Polybutadiene (in particular, polybutadiene with a high content 1,4-cis, usually above 90%, and a low vinyl content, usually below 5%) or mixtures thereof are particularly preferred. Preferably, said polybutadiene is present in the above elastomeric composition in an amount of from 40 phr to 70 phr, more preferably from 50 phr to 70 phr.

The above elastomeric composition can optionally comprise at least one elastomeric polymer of one or more monoolefins with an olefinic comonomer or derivatives thereof. Monoolefins can be selected from: ethylene and α-olefins generally containing 3 to 12 carbon atoms, such as for example propylene, 1-butene, 1-pentene, 1-hexene, 1-octene or mixtures thereof. The following are preferred: copolymers selected from ethylene and an α-olefin, optionally with a diene; isobutene homopolymers or copolymers thereof with small amounts of a diene, which are optionally at least partially halogenated. The diene optionally present generally contains 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene or mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; or mixtures thereof.

The above elastomeric composition can optionally comprise at least an polyisoprene rubber (a1) and/or at least one diene elastomeric polymer (a2) functionalised by reaction with suitable terminating agents or coupling agents. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiim ides, alkyltin halides, substituted benzophenones, alkoxysilanes or aryloxysilanes (see, for example, European patent EP451604 or U.S. patents U.S. Pat. Nos. 4,742,124 and 4,550,142).

Preferably, the diene elastomeric polymer (a) for the application to sidewalls or in the anti-abrasive layer comprises 100 phr of a mixture of diene polymers comprising

- 20 to 100 phr, preferably 40 to 100 phr of natural or synthetic polyisoprene NR/IR,
- 0 to 60 phr, preferably 0 to 50 phr, of BR,
- 0 to 50 phr, preferably 0 to 40 phr, of EPDM.

In an example of embodiment for tyre tread application, the diene elastomeric polymer (a) comprises 100 phr of a mixture of diene polymers comprising 0-100 phr of SBR; 0-80 phr of natural or synthetic polyisoprene NR/IR; 0-70 of BR.

The elastomeric composition comprises at least one salt of S (b) formed by at least one acid AC of formula (I) and at least one amine AM of formula (II) as defined above.

The amount of salt S present in the elastomeric composition, expressed as phr, may vary according to the molecular weights of the at least one acid AC and the at least one amine AM and their stoichiometric ratio.

Preferably, salt S is present in the elastomeric composition in an amount comprising at least 0.5 phr, at least 1 phr, at least 2 phr, at least 3 phr of amine AM of formula (II) as defined above.

Preferably, salt S is present in the elastomeric composition in an amount of at least 1 phr, at least 2 phr, at least 3 phr, at least 4 phr.

In the elastomeric composition comprising at least one salt S, amine AM (II) present in said salt is preferably present in an amount not exceeding 10 phr, preferably 5 phr.

Preferably, salt S is present in the elastomeric composition in an amount not exceeding 20 phr, 15 phr, 10 phr.

In the present elastomeric composition, optionally, the same or a different amine AM of formula (II) may be present in excess of the amount already present in salt S, preferably in a further amount of at least 0.1 phr, at least 1 phr, at least 2 phr, at least 3 phr.

Overall, the amount of amine AM of formula (II) or of two or more amines of formula (II) present in the elastomeric composition, considering both the salified amine and the possible excess amine(s), is generally between 0.5 phr and 20 phr, preferably between 1 and 10 phr, more preferably between 1 and 5 phr.

The elastomeric composition comprises at least 1 phr of at lease one reinforcement filler (c), preferably at least 10 phr, at least 20 phr, at least 30 phr.

Generally, the elastomeric composition comprises no more than 120 phr of reinforcement filler, preferably from 20 phr to 90 phr.

The reinforcement filler may be selected from those commonly used for cross-linked manufactured articles, in particular for tyres, such as carbon black, silica, alumina, aluminosilicates, calcium carbonate, kaolin or mixtures thereof. Carbon black, silica and mixtures thereof are particularly preferred.

According to a preferred embodiment, said carbon black reinforcement filler can be selected from those having a surface area of not less than 20 $m^2/g$ (as determined by Statistical Thickness Surface Area—STSA—according to ISO 18852:2005).

Silica, which can be used in the present invention, may be generally a fumed silica or preferably a precipitated silica, with a surface area BET (as measured according to the ISO 5794/1 standard) of from 50 $m^2/g$ to 500 $m^2/g$, preferably from 70 $m^2/g$ to 200 $m^2/g$.

When a reinforcement filler comprising silica is present, the elastomeric composition may advantageously incorporate a silane coupling agent able to interact with silica and link it to the elastomeric polymer during the vulcanisation.

The coupling agents that are used preferably are silane-based ones that can be identified, for example, by the following structural formula (VII):

$$(R7)_3Si—C_tH_{2t}—Y \quad (VII)$$

wherein the R7 groups, which can be equal or different from each other, are selected from: alkyl, alkoxy or aryloxy groups or halogen atoms, with the proviso that at least one of the R7 groups is an alkoxy or an aryloxy group; t is an integer of between 1 and 6 inclusive; Y is a group selected from: nitrose, mercapto, amino, epoxide, vinyl, imide, chloro, $—(S)_uC_tH_{2t}—Si—(R7)_3$ or —S—COR7, wherein u and t are integers of between 1 and 6, ends included and the R7 groups are as defined above.

Among the coupling agents, bis(3-triethoxysilylpropyl) tetrasulphide and bis(3-triethoxysilylpropyl)disulphide are particularly preferred. An example of the silane coupling agent is TESPT: bis(3-triethoxysilylpropyl)tetrasulphide Si69 marketed by Evonik.

Said coupling agents may be used as such or as suitable mixtures with an inert filler (such as carbon black) so as to facilitate their incorporation into the elastomeric composition.

In the present description, the elastomeric composition not comprising any vulcanising agent (d) is defined as "non-crosslinkable" composition.

The elastomeric composition may optionally comprise at least 0.5 phr of a vulcanising agent (d).

The elastomeric composition comprising the vulcanising agent (d), referred to as cross-linkable elastomeric composition, can be cross-linked according to known techniques, in particular with sulphur-based vulcanising agents commonly used for elastomeric polymers. To this end, after one or more thermo-mechanical processing steps, a sulphur-based vulcanising agent is incorporated in the elastomeric composition, preferably together with vulcanisation accelerants. In the final processing step, the temperature is generally kept below 120° C. and preferably below 100° C., so as to prevent any undesired pre-crosslinking phenomenon.

The vulcanising agent used in the most advantageous manner is sulphur or sulfur-containing molecules (sulphur donors), along with vulcanisation activating agents, accelerants and retardants known to the man skilled in the art. Sulphur or derivatives thereof may be advantageously selected, for example, from soluble sulphur (crystalline sulphur), insoluble sulphur (polymeric sulphur), oil-dispersed sulphur (such as 33% sulphur, known by the trade name Crystex OT33 from Solutia) and sulphur donors such as, for example, caprolactam disulphide (CLD), bis[(trialkoxysilyl)propyl]polysulphides, dithiophosphates; or mixtures thereof. Vulcanisation activators that are particularly effective are zinc compounds, and in particular ZnO, ZnCO3, zinc salts of saturated or unsaturated fatty acids containing from 8 to 18 carbon atoms, such as, for example, zinc stearate, which are preferably formed in situ in the elastomeric composition from ZnO and fatty acids, as well as BiO, PbO, Pb3O4, PbO2, or mixtures thereof. Stearic acid is typically used as an activator with zinc oxide.

Said vulcanisation activators are preferably used in the cross-linkable elastomeric composition in an amount of from 0.5 phr to 10 phr, more preferably from 1 phr to 5 phr and even more preferably from 1.5 phr to 3.5 phr.

Vulcanisation accelerants that are commonly used may be selected from: dithiocarbamates, guanidines, thioureas, thiazoles, sulphenam ides, thiurams, amines, xanthates, thiophosphates, sulphenim ides or mixtures thereof. An example of vulcanisation accelerant is the N-cyclohexyl-2-benzothiazyl-sulfenamide Vulkacit® CZ/C marketed by Lanxess.

Said vulcanisation accelerants are preferably used in the cross-linkable elastomeric composition in an amount of from 0.05 phr to 10 phr, more preferably from 0.1 phr to 5 phr and even more preferably from 0.5 phr to 3 phr.

Vulcanisation retardants that are commonly used may be for example selected from: urea, phthalic anhydride, N-cyclohexylthiophthalimide, N-nitrosodiphenylamine, or mixtures thereof. An example of vulcanisation retardant is N-cyclohexylthiophthalimide (VULKALENT G—Lanxess).

Said vulcanisation retardants are preferably used in the cross-linkable elastomeric composition in an amount of from 0.001 phr to 2 phr, more preferably from 0.005 phr to 0.5 phr and even more preferably from 0.1 phr to 0.3 phr.

The elastomeric composition may comprise, in addition to salt S, at least a second antioxidant selected from the group consisting of diphenylamine and derivatives thereof, phenylenediamine and derivatives thereof, dihydroquinoline derivatives, phenol and derivatives thereof, benzimidazole and derivatives thereof and hydroquinone and derivatives thereof.

According to a preferred embodiment, said phenylenediamine derivatives are selected from amines AM of formula (II) as defined above.

According to a preferred embodiment, said dihydroquinoline derivatives can be selected, for example, from 6-ethoxy-2,2,4-trimethyl-1,2-dihydroquinoline (ETMQ) and polymerised 2,2,4-trimethyl-1,2-dihydroquinoline (TMQ). Polymerised 2,2,4-trimethyl-1,2-dihydroquinoline (TMQ) is particularly preferred.

According to a preferred embodiment, said phenol derivatives can be selected, for example, from 2,6-di-t-butyl-hydroxytoluene (BHT), 2,6-tert-butyl-4-nonylphenol, 2,6-tert-butyl-4-ethylphenol, 4-nonylphenol, 3-(2,3-tert-butyl-4-hydroxyphenyl) propanoic acid methyl ester and 3,5-di-t-butyl-4-hydroxy-hydrocinnamic acid octadecyl ester. 2,6-di-t-butyl-hydroxytoluene (BHT) is particularly preferred.

According to a preferred embodiment, said benzimidazole derivatives can be selected, for example, from 2-mercapto-benzimidazole (MBI), zinc-2-mercaptobenzimidazole (ZMBI), methyl-2-mercaptobenzimidazole (MMBI), and zinc methyl 2-mercapto-benzimidazole (ZMMBI).

According to a preferred embodiment, said hydroquinone derivatives can be selected, for example, from 2,5-di-t-butyl hydroquinone (TBHQ), 2,5-di(tert-amyl) hydroquinone (TAHQ), hydroquinone (HQ), p-methoxy-phenol and toluhydroquinone (THQ).

According to a preferred embodiment, the amount of said second antioxidant in the elastomeric composition is at most 1.0 phr, more preferably at most 0.5 phr. Advantageously, the use of salts as defined herein in the compositions for tyres allows reducing the use of antioxidants that are designed to slow down the formation and propagation of cracks in static and dynamic stress conditions.

In order to further improve the workability, a plasticiser, generally selected from mineral oils, vegetable oils, synthetic oils or mixtures thereof, such as paraffinic oils, aromatic oils, naphthenic oils, phthalates or mixtures thereof, can be added to said elastomeric composition. The amount of plasticiser generally ranges from 0 phr to 70 phr, preferably from 0 phr to 30 phr.

The present salts S, when in the form of more or less viscous liquids, can also act as plasticisers in the elastomeric composition, advantageously allowing the amount of conventional plasticiser to be reduced.

The elastomeric composition may comprise at least one wax. A petroleum wax is generally used as a wax, containing a component having from 20 to 50 carbon atoms and having an average number of carbon atoms from 30 to 35. Preferably, the wax is used in amounts ranging between 0 and 4 phr, more preferably between 0 and 2 phr.

In a variant of the invention, the elastomeric composition does not comprise waxes. In the absence of waxes, the surfacing of the anti-degradation agents is slowed down, thus prolonging the efficacy.

The applicant has found that salts S as defined herein improve the ozone resistance of the cross-linked elastomeric compositions. In practice, their use can substantially reduce or prevent the use of wax, usually employed to provide static protection from ozone.

In one embodiment, the elastomeric composition is substantially free of wax and other anti-ozonants and/or antioxidants in general, except those of salt S as defined herein.

For the purposes of the present invention and following claims, the expression “substantially free of wax” or “substantially prevent the use of wax” refers to a wax content of less than 0.5 phr. According to a preferred embodiment, the elastomeric composition comprises an amount of wax of less than 0.2 phr, and more preferably less than 0.1 phr.

The elastomeric composition may comprise other commonly used additives, selected according to the specific application for which the composition is intended, for example anti-ageing agents, anti-reversion agents, adhesives, fibres (such as Kevlar® pulp), or mixtures thereof.

The elastomeric composition according to the present invention is generally prepared by simple direct incorporation of the preformed salt S in the elastomeric composition itself.

In particular, the elastomeric composition of the invention can be prepared in several steps by mixing the basic elastomeric ingredients (a) and salt S (b), also raw and optionally together with an excess of the same or another amine AM, to the filler (c), to the other additives optionally present, optionally to yield one or more intermediate non-crosslinkable elastomeric compositions and finally, to the vulcanising agent (d) and any vulcanisation additives according to the techniques known in the art. Alternatively, the elastomeric composition of the invention can be prepared in a single mixing step.

The mixing steps can be performed, for example, using an open mixer of the cylinder type or an internal mixer of the type with tangential rotors (Banbury) or with interpenetrating rotors (Intermix), or in continuous mixers of the Ko-Kneader type (Buss) or of the co-rotating or counter-rotating twin-screw type.

For example, the raw salt S is incorporated in the elastomeric material by mixing with an internal mixer model Pomini PL 1.6, at temperatures generally ranging between 40 and 145° C., preferably not higher than 120° C. for times generally ranging between 3 min. and 0.5 hours to yield the elastomeric composition.

The third aspect of the invention is a tyre component comprising an elastomeric composition according to the invention.

Said component may be green (not vulcanised) or optionally at least partially vulcanised, i.e. obtained by at least partial vulcanisation of a cross-linkable elastomeric composition as defined above, also comprising a vulcanising agent and possible vulcanisation retardants or adjuvants.

Preferably, said tyre component is a surface component, i.e. a component that is more easily subject to the degrading action of ozone and oxygen in the air.

Preferably, said tyre component is selected from tread, pair of sidewalls and anti-abrasive layer.

These tyre components, more subject to wear than others due to the combination of the ozone degrading action and mechanical stress, take special advantage from the elastomeric compositions according to the invention.

The fourth aspect of the invention is a tyre for vehicle wheels comprising at least one tyre component comprising an elastomeric composition obtained by vulcanising an elastomeric composition as defined above.

Preferably, said tyre component is selected from tread, pair of sidewalls and anti-abrasive layer.

The tyre according to the invention preferably comprises: a substantially toroidal carcass structure, having opposite lateral edges associated with respective right and left bead structures, said bead structures incorporating at least one bead core and at least one bead filler; a belt structure applied in a radially outer position with respect to said carcass structure; a tread band radially superimposed on said belt structure, a pair of sidewalls laterally applied on opposite sides with respect to said carcass structure and an anti-abrasive layer, usually arranged in an axially outer position with respect to the carcass flap.

Preferably, one or more of said components comprise a cross-linked elastomeric composition obtained by cross-linking an elastomeric composition according to the invention.

More preferably, one or more among tread, pair of sidewalls and anti-abrasive layer comprise a cross-linked elastomeric composition obtained by cross-linking a cross-linkable elastomeric composition according to the invention.

Preferably, the tyre according to the invention is a tyre for motorcycles, for heavy load vehicles or for motor vehicles.

Preferably, the tyre according to the invention is a tyre for high or ultra high performance vehicles (HP, UHP, SUV), and in particular is a tyre for motor vehicles subject to extreme driving conditions even at high temperatures (prolonged drive and sporting competitions in the desert).

The tyre according to the invention can be a winter or snow tyre or for all seasons. The tyre according to the invention can be a tyre for motor vehicles, heavy vehicles or motorcycles.

Preferably, the tyre according to the invention is a tyre for automobiles.

With reference to the accompanying FIG. 1, which is a cross section view of a portion of a tyre according to the invention, "a" indicates an axial direction and "X" indicates a radial direction. For simplicity, FIG. 1 shows only a portion of the tyre, the remaining portion not shown being identical and arranged symmetrically with respect to the radial direction "X".

The tyre (100) comprises at least one carcass ply (101), whose opposite lateral edges are associated with respective bead structures comprising at least one bead core (102) and at least one bead filler (104). The association between the carcass ply (101) and the bead core (102) is obtained herein by folding up the opposite lateral edges of the carcass ply (101) around the bead core (102), so as to form the so-called carcass flap (101*a*), as shown in FIG. 1.

Alternatively, the conventional bead core (102) can be replaced with at least one annular insert formed by rubber cords arranged in concentric loops (not shown in FIG. 1) (see, for example, the European patent applications EP 928 680 or EP 928 702).

The carcass ply (101) usually comprises a plurality of reinforcing cords arranged parallel to one another and at least partially coated with a layer of cross-linked elastomeric material. These reinforcing cords usually consist of textile fibres such as rayon, nylon or polyethylene terephthalate, or steel wires twisted together, coated with a metallic alloy (e.g. zinc/copper, zinc/manganese, zinc/molybdenum/cobalt alloys).

The carcass ply (101) is usually radial, i.e. it incorporates reinforcing cords arranged in a direction substantially perpendicular to the circumferential direction.

The bead core (102) is enclosed in a bead structure (103), defined along an inner circumferential edge of the tyre (100), with which the tyre engages on a rim (not shown in FIG. 1) that is part of a vehicle wheel. The space defined by each carcass flap (101*a*) contains a bead filler (104).

A anti-abrasive layer (105) is usually placed in an axially outer position with respect to the carcass flap (101*a*).

A belt structure (106) is applied along the circumference of the carcass ply (101). In the particular embodiment shown in FIG. 1, the belt structure (106) comprises two belt strips (106*a*, 106*b*) incorporating a plurality of reinforcing cords, typically metal cords, which are parallel to one another in each strip and intersect with respect to the adjacent strip, so as to form a predetermined angle with respect to a circumferential direction. At least one reinforcing layer at 0 degrees (106*c*), commonly known as "belt at 0°", may optionally be applied on the radially outermost belt structure (106*b*), generally incorporating a plurality of reinforcing cords, typically textile cords, arranged at an angle of a few degrees, typically in a range of from 0 to 5 degrees with respect to a circumferential direction, usually coated with a cross-linked elastomeric composition.

A sidewall (108) obtained by cross-linking the elastomeric composition INV2 (Table 4) is applied externally on the carcass ply (101), this sidewall extending, in an axially outer position, from the bead (103) to the end of belt structure (106).

A tread band (109), whose lateral edges are connected to the sidewalls (108), is applied circumferentially in a radially outer position to the belt structure (106). Externally, the tread band (109) has a rolling surface (109*a*) intended to come in contact with the ground. Circumferential grooves, which are connected by means of transverse notches (not shown in FIG. 1) so as to define a plurality of blocks of various shapes and sizes distributed over the rolling surface (109*a*), are generally made formed in this surface (109*a*), which for simplicity is represented smooth in FIG. 1.

A sidewall insert, not shown, can be placed in an axially inner position with respect to the sidewall (108) and extending radially by a length between the bead (103) and the lateral edge of the tread band (109). Said sidewall insert is normally used in the case of extended mobility tyres, such as self-bearing tyres.

A tread under-layer (111) may be arranged between the belt structure (106) and the tread band (109). As shown in FIG. 1, the tread under-layer (111) can have a uniform thickness. Alternatively, the tread under-layer (111) can have a variable thickness in the cross direction. For example, the thickness can be greater in the vicinity of the outer edges thereof with respect to a central area. In FIG. 1, said tread under-layer (111) extends on a surface substantially corresponding to the extension surface of said belt structure (106). Alternatively, said tread under-layer (111) only extends along at least one portion of the extension of said belt structure (106), for example in opposite lateral portions of said belt structure (106) (not shown in FIG. 1).

A strip (110) made of elastomeric material, commonly known as "mini-sidewall" can optionally be present in the connecting area between the sidewalls (108) and the tread band (109), this mini-sidewall being generally obtained through co-extrusion with the tread band and allowing the mechanical interaction between the tread band (109) and the sidewalls (108) to be improved. Alternatively, the end of the sidewall (108) directly covers the lateral edge of the tread band (109).

In the case of tubeless tyres, a first layer (112), generally known as "liner", which provides the necessary impermeability to the inflation air of the tyre, can also be provided in an inner position with respect to the carcass ply (101).

Moreover, a second layer (not shown in FIG. 1), generally known as "under-liner", can be placed between the liner (112) and the carcass ply (101).

Bead 103 of the tyre may comprise a further protective layer which is generally known by the term of "chafer" 121 or protective strip and which has the function of increasing the rigidity and integrity of bead 103.

Chafer 121 usually comprises a plurality of cords incorporated in a cross-linked elastomeric material and which are generally made of textile materials (such as aramid or rayon) or of metallic materials (such as steel cords).

The finished tyre shown in FIG. 1 can be produced by methods and apparatuses that are known in the art as described, for example, in European patent EP199064 or in U.S. Pat. Nos. 4,872,822 and 4,768,937. Typically, said process includes the manufacture of a green (or raw) tyre by assembling the various structural elements described above on one or more supports (such as one or more drums), and then by moulding and vulcanising the green tyre.

The following examples are now provided for merely illustrative and non-limiting purposes of the present invention.

EXAMPLES

Methods of Measurement

Salts S and the elastomeric compositions described hereinafter were assessed according to the following methods:

FT-ATR (attenuated total reflection Infrared spectroscopy): Instrument: Perkin Elmer spectrum one, provided with diamond crystal. The spectra were acquired at a resolution of 2.0 $cm^{-1}$, 4 scans to reduce the background noise.

DSC (Differential Scanning Calorimetry, Instrument: Mettler 823e, for salts Temperature ramp: −100° C. to +100° C., 10° C./min., in nitrogen atmosphere at 60 ml/min.

TGA (Thermogravimetric analysis): instrument Mettler Toledo TGA SDTA 851. In order to assess the volatility of the Salts, the sample heating conditions were as follows:

initial heating from 25° C. to 150° C. at 10° C./min.;
isotherm at 150° C. for 15 min.
nitrogen flow: 60 ml/min.

The temperatures applied in this analysis are typical of mixing, extrusion and calendering processes of the compounds. The weight loss percentage after isotherm at 150° C. for 15 minutes and the rate at which they lose weight during isothermal treatment at 150° C. were assessed for all samples. To this end, a linear regression was made on the experimental points concerning the weight loss undergone by the samples during the isotherm at 150° C.

The slope of the resulting straight lines allows the rate at which the different compounds lose weight to be quantified and thus provides an estimate of the volatility of the same.

At the end of the thermal cycle, the percentage weight loss of salt S1 and of 6PPD at the three temperatures of 110° C., 130° C. and 150° C. was calculated.

The other TGA analyses described in the present experimental part were conducted under the following conditions:

heating from 30-600° C., 10° C./min. under nitrogen,
move to air and isotherm is kept at 600° C. for 15'.

Chemiluminescence (CL)

Figure 4:
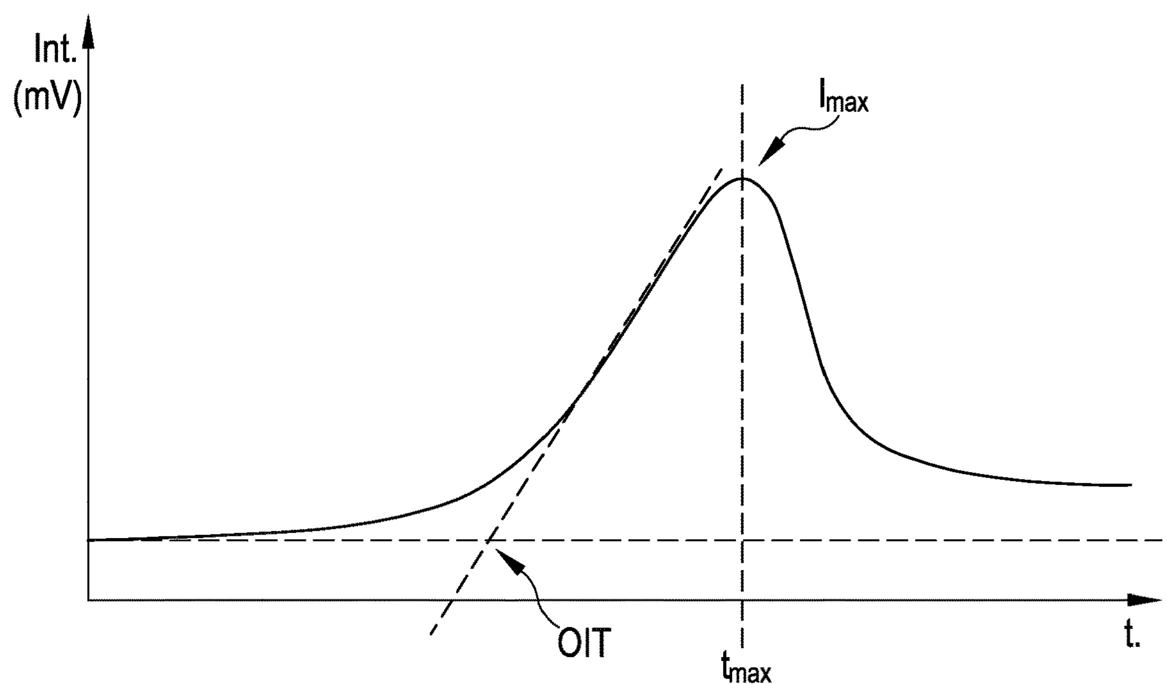
FIG. 4 is a graph representative of a typical curve of a chemiluminescence (CL) analysis with the intensity of the light emitted on the ordinate versus the response time t on the abscissa.

Chemiluminescence (CL) is used for characterising thermo-oxidative ageing processes of elastomers. This technique uses the emission of quanta of light released by the decay of the excited state of an intermediate product formed during the oxidation of the polymer. The intensity of the light emitted is a function of the concentration of the chemical species in the excited state and the reaction time. FIG. 4 shows a the pattern of a typical curve of a CL analysis with the intensity of the light emitted on the ordinate versus the response time t on the abscissa.

The OIT (oxidation induction time) value is an indication of the oxidative stability of the material analysed: the higher the OIT value, the more the material is resistant to oxidation. The oxidation induction time corresponds to the intersection point of the tangent to the curve with the time axis.

The measurements was carried out under the following conditions:

Instrument: CL 400 ChemiLume™ Analyzer, ATLAS Test Instruments Group and MSS Elektronik;
Temperature: 120° C.;
Gaseous atmosphere: N2 during heating, O2 at the measurement temperatures;
flow rate: 25±5 ml/min/cell Sample preparation: samples of compositions not comprising vulcanising agents (non-crosslinkable compositions, Table 3) (approximate weight of 10 mg) were cut and placed in aluminium crucibles. A double measurement was conducted for each sample.

Mooney Viscosity ML (1+4) at 100° C. was measured on non-vulcanised samples according to the ASTM D1646 standard, using a rheometer Alpha Technologies type MDR2000.

Mooney viscosity is based on the measurement of the torque required to keep a rotor immersed in the composition to be evaluated rotating.

The standard test was performed at a temperature of 100° C. with 1 min. preheating and 4 min. test (identified with the initials ML (1+4). The rotation speed is 0.209 rad/s (2 rpm). The Mooney scale is directly proportional to the torque applied to the rotor, with the following relation: 1 Mooney unit=0.083 N·m.

The static mechanical properties of the vulcanised samples were measured at 23° C. according to the ISO 37:2005 standard.

The tensile test according to ISO37-UNI6065 generates a stress versus deformation curve. The instrument used was a dynamometer equipped with optical strain gauge since the displacement of the movable crosspiece is not directly proportional to the sample elongation in the useful section. The test was performed on Dumbell specimens of the above elastomeric materials vulcanised for 10 minutes at 170° C.

The static mechanical properties (Ca05 load at 50% elongation, Ca1 load at 100% elongation and Ca3 load at 300% elongation, expressed in MPa) according to the UNI 6065 standard were measured at different elongations (50%, 100%, 300%). Load, elongation at break and breaking energy, respectively CR (MPa) and AR % and ($J/cm^3$) were also measured.

The dynamic mechanical properties were measured with a dynamic dynamometer of servo-hydraulic type in compression mode according to the following process. A specimen of the material vulcanised at 170° C. for 10 minutes having a cylindrical shape (length=25 mm; diameter=12 mm), statically predeformed at 20% compression with respect to the initial length and maintained the predetermined temperature (23° C. or 70° C.) for the entire duration of the test was subjected to a dynamic sinusoidal deformation having a width of ±7.5% with respect to the length under static predeformation, with a frequency of 100 Hz. The dynamic elastic properties were expressed in terms of dynamic elastic modulus (E') and tan delta (loss factor). The Tan delta value was calculated as the ratio between the viscous dynamic module (E") and the dynamic elastic modulus (E').

Static Ozone Test

The static ozone test was conducted as follows.

Samples of the elastomeric compositions, vulcanised at 170° C. for 10 minutes, having an hourglass shape with the longer sides with concave profile and dimensions of 90 mm×180 mm×3 mm were subjected to traction along the major axis up to 30% deformation. Then, the samples thus stretched were attached to plates with an adhesive to maintain the traction thereof. The plates thus obtained were placed in an apparatus with testing camera Mod. 703, manufactured by Hampden, to assess the degradation by ozone by operating under the following conditions:

ozone concentration: 50±5 pphm (parts per hundred million);

temperature: 50±2° C.;

exposure time: 70 hours.

After 70 hours under the conditions described above, the specimens were examined visually to determine the presence of cracks.

A score of 10 was assigned in the case of absence of cracks all over the surface and no sign of wear (highest resistance to deformation), 0 in case of cracking over the entire surface (lowest resistance to deformation), while intermediate scores indicated the presence of cracking proportionally on a part of the surface (intermediate resistance to deformation). For some samples, the extent of cracking was expressed as a percentage of propagation in longitudinal direction.

The samples were further inspected visually to check for the presence of stains. A subjective average quality score was assigned to the appearance of the surface of each sample, as summarised below:

| Score | Appearance |
|---|---|
| a | stainless |
| b | slightly stained |
| c | stained |
| d | not stained but slightly oily |

Dynamic Ozone Test

The dynamic ozone test was conducted as follows. Samples of the elastomeric compositions, having dimensions of 50 mm×10 mm×2 mm, vulcanised at 170° C. for 10 minutes, were placed inside a glass bell in which ozonated air was conveyed [ozone concentrations equal to 50±2 pphm (parts per hundred million)] and were dynamically and continuously subjected to traction from 0% to 20% deformation (frequency of 0.5 Hz). The test was performed at a temperature of 50° C. (±1° C.). Starting from the first hour and then after every 2 hours (for a total time of 70 hours) under the conditions described above, the samples were examined with optical microscope (40×) to determine the presence of cracking.

The results of this test were expressed on a rating scale that goes from 0 to 4, where 0 indicates no cracking visible with the optical microscope (40×) (very good) and 4 indicates cracking visible with the optical microscope (40×) and with the naked eye (bad).

The following Table 2 summarises the Salts, the non-crosslinkable and crosslinkable elastomeric compositions, comparative or according to the invention, with reference to the respective examples:

TABLE 2

| AC | $R—(OC_mH_{2m})_w—(OC_nH_{2n})_z—X$ | AM | Salts Ex. 1 | Comp. non-cross. | Ex. | Comp. crosslinkable sidewall | Ex. |
|---|---|---|---|---|---|---|---|
| — | — | — | — | C1 | 2D | — | — |
| — | — | 6PPD | — | C2 | 2A | C5 | 3A |
| — | — | 6PPD + Melflux | | | | C7 | 4A |
| AC1 | $(C_{12}$-$C_{14})$-$(OCH_2CH_2)_{4,5}—OCH_2COOH$ Akypo RLM45CA | — | — | C3 | 2E | — | — |
| AC1 | Akypo RLM 45 CA | 6PPD | S1 | INV1 | 2B | INV2 | 3C |
| AC2 | $(C_{12}$-$C_{14})$-$(O—CH_2CH_2)_4—O—PO_3H$ Danox FL-1214/16 | 6PPD | S2 | — | — | — | — |
| AC3 | $(C_8)$-$(O—CH_2CH_2)_8—OCH_2—COOH$ Akypo LF2 | 6PPD | S3 | — | — | INV3, INV4, INV6 | 3D 4B 4D |
| AC4 | $CH_3(CH_2)_{16}—COOH$ Stearic acid | 6PPD | S4 | C4 | 2C | C6 | 3B |
| AC1 | Akypo RLM 45 CA | 4ADPA | S5 | | | | |
| AC2 | Danox FL-1214/16 | 4ADPA | S6 | | | | |
| AC3 | Akypo LF2 | 4ADPA | S7 | | | INV5 | 4C |

AC acid, AM amine, S salt, INV according to the invention, C comparative, S4 according to WO0168761, 6PPD: N-(1,3-dimethylbutyl)-N'-phenyl-p-phenylenediamine; 4ADPA: 4-aminodiphenylamine, Melflux: methacrylic acid copolymer and unsaturated monomers containing polyoxyethylene side chains.

Example 1: Preparation of the Salts

Preparation of Salt S1 (from Acid AC1 and 6PPD)

100 g (0.22 moles) of acid AC1 $R—O—(CH_2—CH_2O)_n—CH_2—COOH$ (wherein $R═C_{12}$-$C_{14}$, n=4.5, M.W. 457 g/mole, commercial name Akypo RLM45CA, manufacturer Kao) were weighed and transferred to a one-necked balloon provided with a 250 ml fall. 58.7 g (0.22 mole) of 6PPD (M.W. 268.4 g/mole, Santoflex/supplier Solutia/Eastman, in equimolar amount with respect to the acid calculated with respect to the highest content of acid groups predictable). The balloon was immersed in an oil bath at 50° C. and the dissolution of the 6PPD tablets was completed under magnetic, yielding a dark purple liquid. It was allowed to react under stirring at 70° C. for 3 h, then it was allowed to cool to room temperature.

A homogeneous purplish-black, viscous liquid was obtained which flows well even at room temperature, soluble in acetone.

Figure 3:
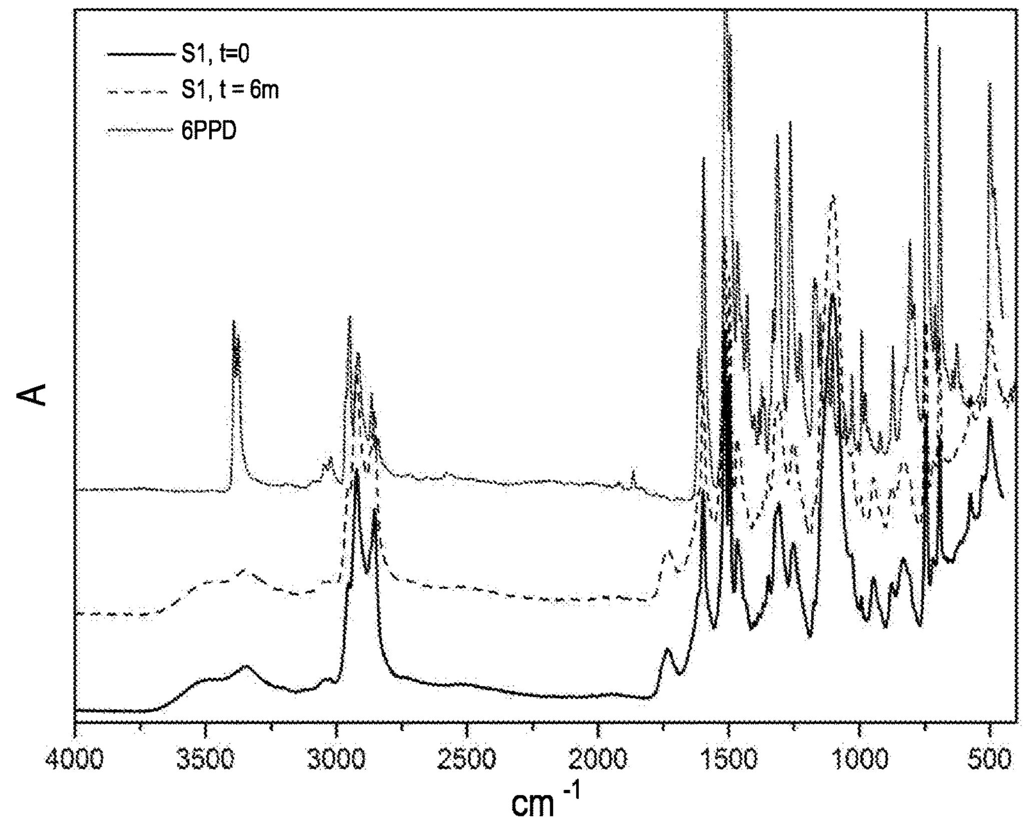
Figure 3:
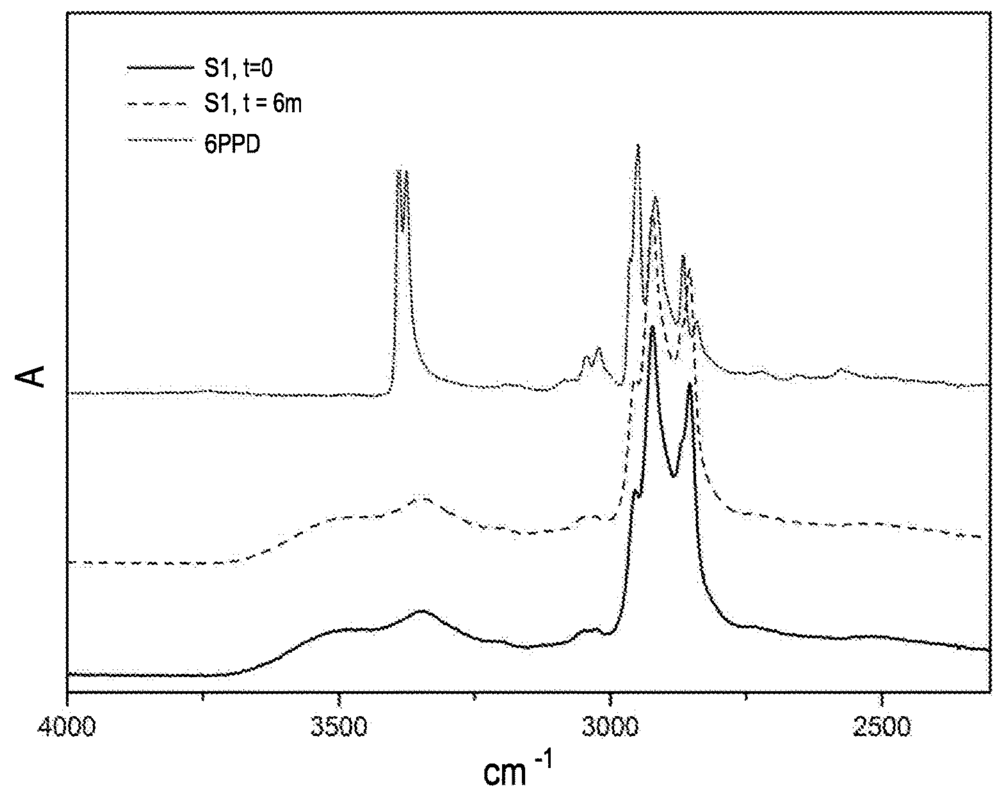

Salt S1 was thus characterised:

FT-ATR: the spectrum (FIG. 3) showed a change in the stretching signal of the NH bounds of 6PPD at about 3390 and 3375 $cm^{-1}$.

DSC: in the DSC plot of salt S1, no melting peaks attributable to the reagents were observed (6PPD at 54° C. and Akypo RLM 45 CA at 9.1° C.).

The synthesis methodology of salt S1 of 6PPD described above is particularly simple and advantageous: the acid itself also acts as a solvent, allowing working in conditions of maximum concentration with undeniable advantages at an industrial level. Moreover, the reaction is substantially quantitative and virtually without formation of significant by-products and provides a product which can be incorporated directly in the elastomeric compositions without any further purification.

Preparation of Salt S2 (from Acid AC2 and 6PPD)

The reaction was carried out substantially as described in example 1 in the absence of solvent, by adding 73.9 g of 6-PPD (0.27 mole) to 125 g of DANOX FL-1214/16 (AC2, 0.27 mole, M.W. 453 g/mole for the molecular formula $C_{22}H_{46}O_7P$, with R═C14 and n=4) and stirring for 2 h at 90° C. A very viscous, dark-coloured liquid was obtained. Salt S2 was characterised by FT-ATR (a change in the stretching signal of link NH of 6PPD was observed), DSC (absence of endothermic peaks of 6PPD at about 54° C. and of acid AC2 at 18.5° C.; only glass transition was observed at about −53° C.) and TGA.

Preparation of Salt S3 (from Acid AC3 and 6PPD)

The reaction was carried out substantially as described in example 1 in the absence of solvent, by adding 33.2 g (0.12 mole) of 6-PPD to 65 g (0.12 mole) of Akypo LF 2 (AC3) (M.W. 540 g/mole) and stirring for 2 h at 90° C. A very viscous, dark-coloured liquid was obtained. Salt S3 was characterised by FT-ATR (a change in the stretching signal of link NH of 6PPD was observed) and DSC (absence of endothermic peaks of 6PPD at about 54° C. and of acid AC3).

Preparation of Comparative Salt S4 (6PPD Stearate)

Comparative salt S4 was prepared on 50 grams of 6PPD and 53 g of stearic acid following the procedure described on page 10 in patent application WO0168761 on behalf Flexsys B.V., obtaining a dark waxy solid.

Figure 2:
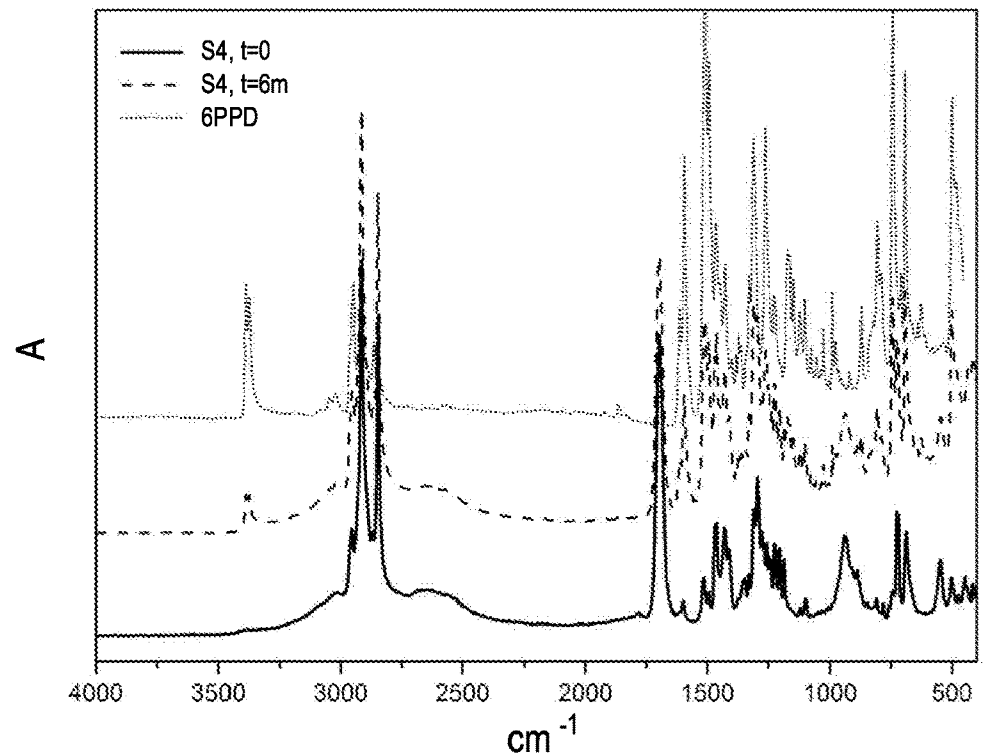
FIGS. 2 and 3 are are the FT-IR stability spectra at 6 months of samples of comparative salt S4 and according to the invention S1.
Figure 2:
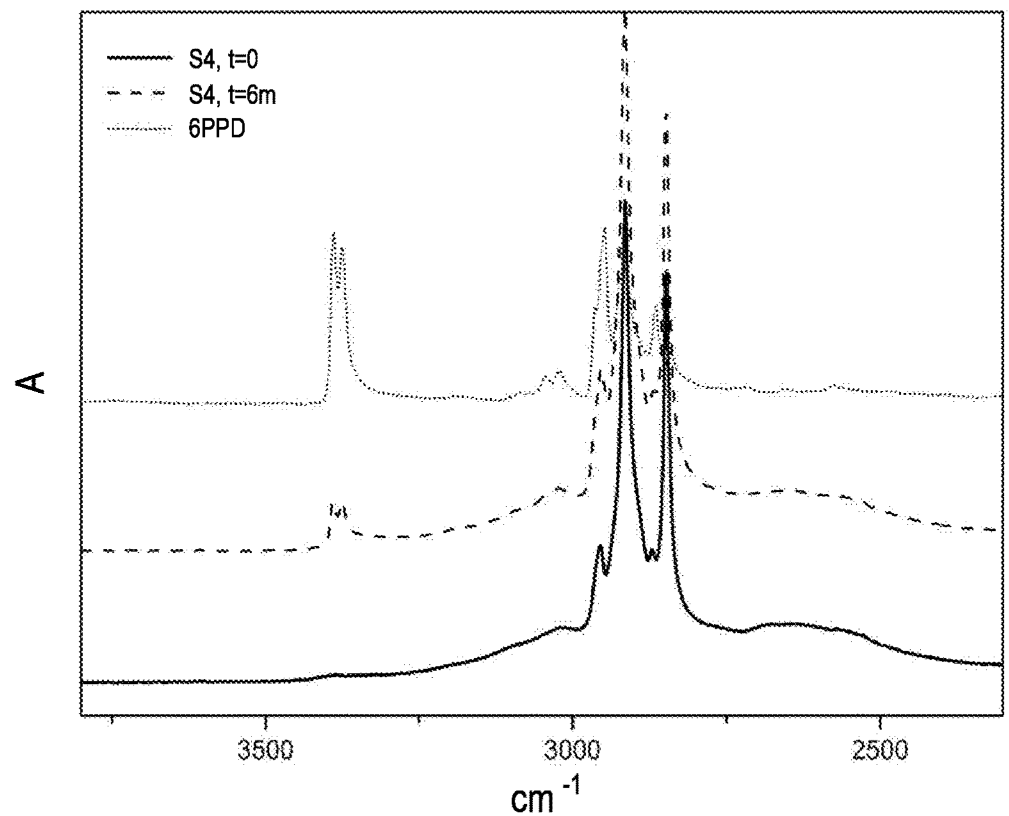

The characterisation of salt S4 by FTIR is shown in FIG. 2, at time zero and after 6 months, compared to 6PPD.

Preparation of Salt S5 (from Acid AC1 and 4ADPA)

The reaction was carried out substantially as described in example 1 in the absence of solvent, by adding 35 g (0.19 mole) of 4ADPA (M.W. 185 g/mole) to 88.65 g (0.19 mole) of Akypo RLM45CA (AC1) and stirring for 2 h at 90° C. A very viscous, dark-coloured liquid was obtained. Salt S5 was characterised by FT-ATR (the signal relative to the primary amine disappears in the reaction product); DSC (in the DSC plot of the product prepared, an endothermic peak was observed at T=0.43° C., different both from that observed for the acid, T=9° C., and from that observed for the base, T=76° C.) and TGA.

Preparation of Salt S6 (from Acid AC2 and 4ADPA)

The reaction was carried out substantially as described in example 1 in the absence of solvent, under mechanical stirring, by adding 30 g (0.163 mole) of 4ADPA to 73.5 g (0.162 mole) of Danox FL-1214/16 (AC2) and stirring for 10-15 min. at 90° C. A grey-blue wax was obtained.

Salt S6 was characterised by FT-ATR, DSC (in the plot, an endothermic peak was observed at T=2° C., different both from that observed for the acid, T=9° C., and from that observed for the base, T=76° C.) and TGA.

Preparation of Salt S7 (from Acid AC3 and 4ADPA)

The reaction was carried out substantially as described in example 1 in the absence of solvent, by adding 27 g (0.147 mole) of 4ADPA to 80 g (0.146 mole) of Akypo LF2 (AC3) and stirring for 2 h at 90° C. A dark viscous liquid was obtained. Salt S6 was characterised by FT-ATR (the signal relative to the primary amine disappears in the salt); DSC (no endothermic peak was observed in the plot for the acid, T=−1.6° C. or for the base, T=46° C., only a glass transition at T=−43° C.) and TGA. Unless otherwise indicated, Salts S1 to S7 were prepared using substantially equimolar amounts of acid AC and amine AM.

Stability of Salt S1 of 6PPD

The stability of this salt was investigated by FT-IR on samples stored at room temperature in dark capped glass bottles. Unlike the 6PPD stearate (S4)—which tends to release the stearic acid and 6PPD components, as shown in FIG. 2 by the presence after 6 months of the signal of the non-salified N—H group of 6PPD at about 3390 and 3375 $cm^{-1}$ (particularly evident from the comparison in the second magnified spectrum at time zero t=0 and after 6 months t=6 m), salt S1 has proved stable: in fact, in the spectrum recorded on a sample of S1 after 6 months, the NH signal characteristic of 6PPD was absent (see the magnification of the IR spectrum in FIG. 3, initial spectrum t=0 vs spectrum after 6 months t=6 m, unchanged).

Assessment of 6PPD Salt S1 Volatility

Volatility studies of the 6PPD with respect to that of salt S1 of 6PPD were conducted with acid AC1 by thermogravimetric analysis.

Salt S1 of 6PPD showed lower volatility compared to 6PPD at all temperatures, in particular a percentage reduction of weight of 6PPD lost by evaporation of 7% at 110° C., 29% at 130° C. and 23% at 150° C. This lower volatility advantageously allows reducing 6PPD losses during the process and limiting the variability of the final content of the same, with greater reproducibility of processes, less waste, less harmfulness for the operators and better environmental impact.

Example 2

Preparation of Non-Crosslinkable Isoprene-Based Elastomeric Compositions

The following Table 3 lists comparative compositions non-crosslinkable isoprene-based elastomeric compositions (C1-C4) and comprising the salt according to the invention INV1, then evaluated in terms of resistance to oxidation according to the chemiluminescence technique (FIG. 8):

TABLE 3

| | Sample | | | | |
|---|---|---|---|---|---|
| | 2A | 2B | 2C | 2D | 2E |
| | Composition (phr) | | | | |
| | C2 | INV 1 | C4 | C1 | C3 |
| IR | 100 | 100 | 100 | 100 | 100 |
| 6PPD | 4 | — | — | — | — |
| Akypo RLM 45CA (AC1) | — | — | — | — | 7.11 |
| 6PPD-Akypo RLM 45CA (S1) | — | 11.11* | — | — | — |
| Stearic acid-6PPD (S4) | — | — | 8.33 | — | — |

wherein 11.11* correspond to 7.11 phr AC1+4 phr 6PPD; IR: isoprene rubber, Stearic acid: Stearina N, Sogis.

Non-crosslinkable compositions were prepared by adding the components to an internal mixer (model BRABENDER Plasti-Corder®, mixing chamber volume 50 cc, filling factor of 90%) for about 4 min. at a temperature of 80° C. and at RPM=60 R.

Assessment of the Oxidation Resistance of the Non-Crosslinkable Isoprene-Based Elastomeric Compositions Comparative samples C1 (rubber IR without additives), C2 (rubber IR including only 6PPD), C3 (rubber IR including only acid AC1), C4 (rubber IR including the stearic acid-6PPD adduct S4) and the sample according to the invention INV1 (rubber IR including salt S1) were subjected to chemiluminescence analysis CL and the corresponding induction times OIT were measured and plotted (FIGS. 5 to 8).

Figure 5:
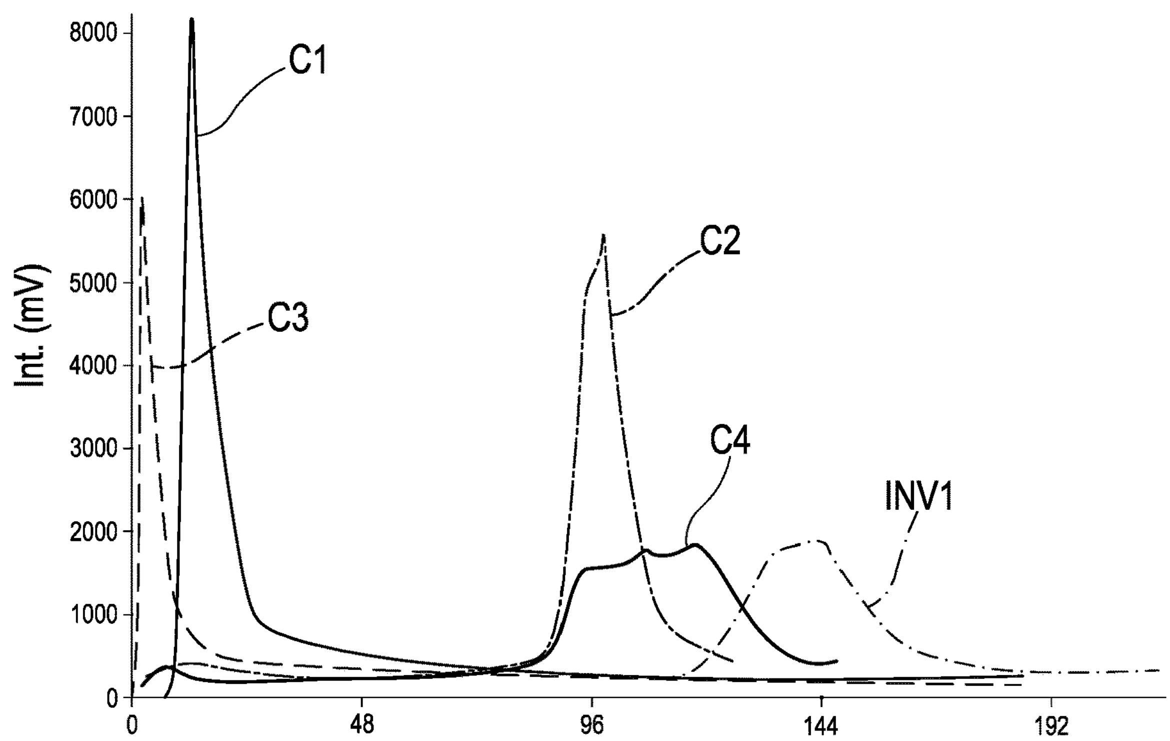
FIG. 5 is a graph of the intensity of the light emitted over time by comparative samples of non-crosslinkable elastomeric compositions C1, C2, C3, C4, or comprising salt S1 according to the invention (INV1) in the chemiluminescence analysis.

FIG. 5 shows how the composition comprising salt S1 according to the invention show the highest induction time, indicating a higher oxidative resistance.

Figure 6:
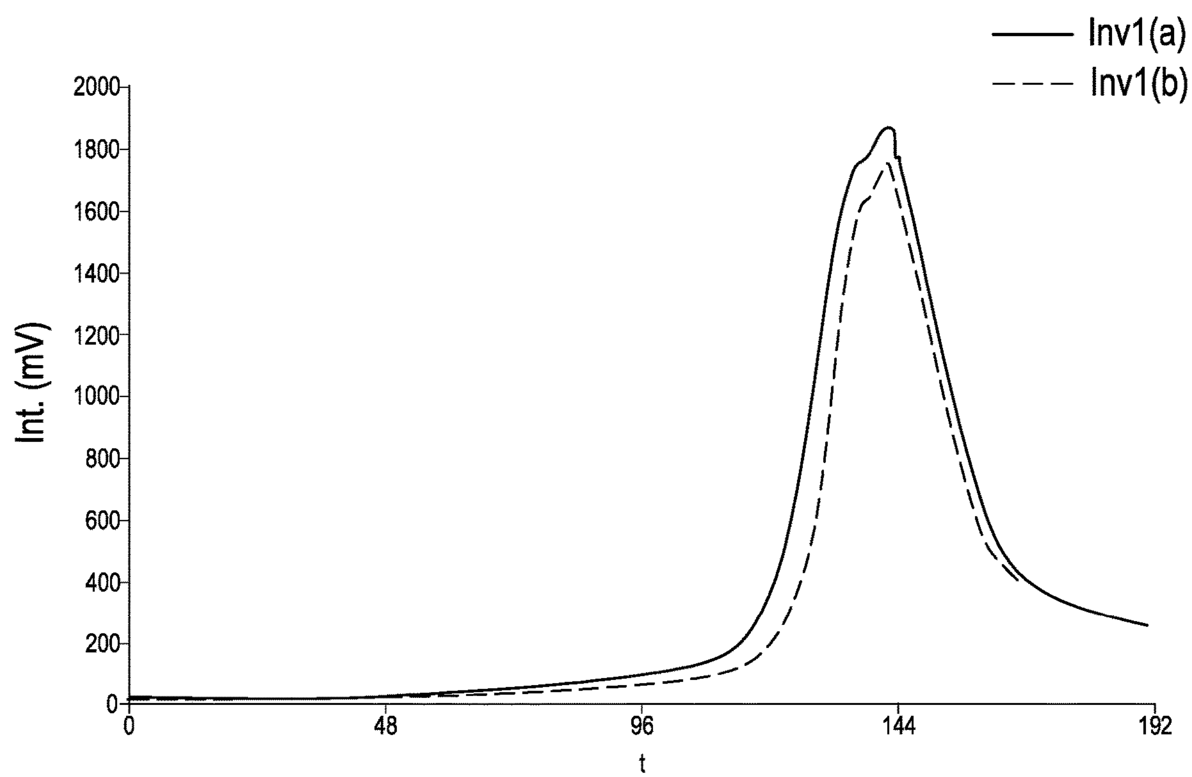
FIG. 6 is the chemiluminescence diagram measured on two samples of the same elastomeric composition of salt S1 according to the invention (INV1).
Figure 7:
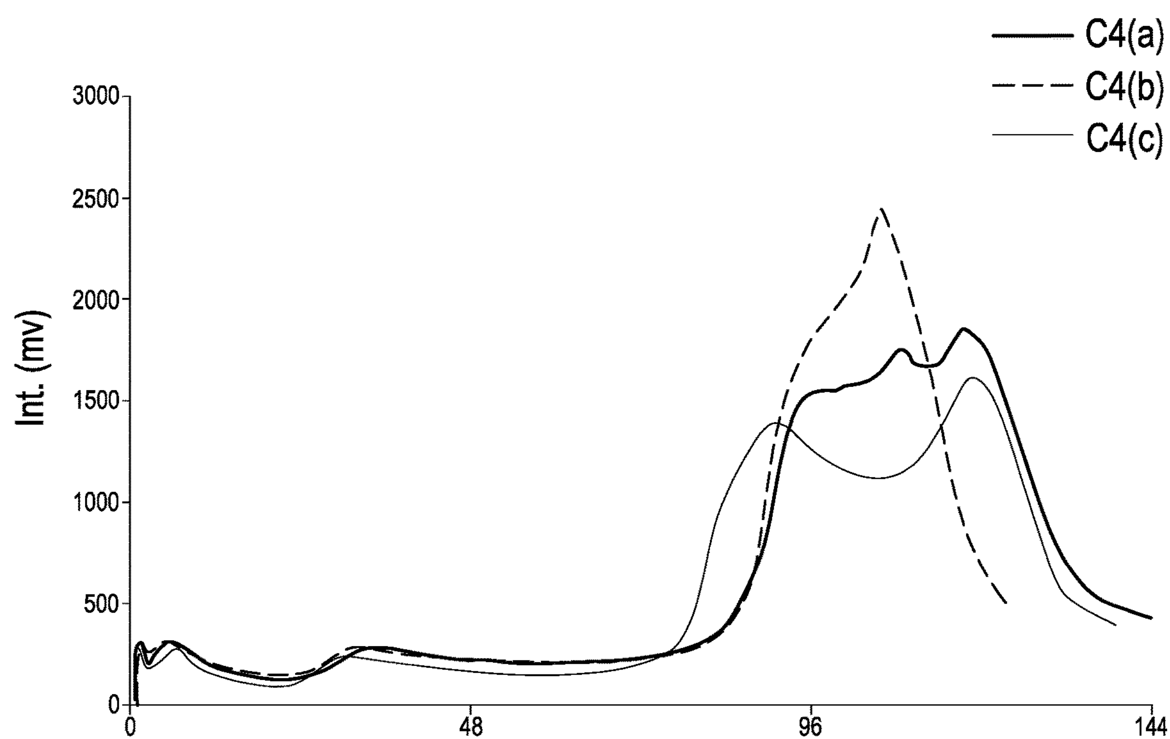
FIG. 7 is the chemiluminescence diagram measured on three samples of the same elastomeric composition of the comparative salt S4 (C4).

FIGS. 6 and 7 show the CL curves measured on two samples of the same composition of salt S1 according to the invention (INV1a and INV1b) and three samples of the same composition of the comparative salt S4, respectively. As can be seen, the compositions comprising salt S1 appear much more reproducible in terms of oxidative performance than those comprising the comparative salt S4 (C4a, C4b and C4c).

Figure 8:
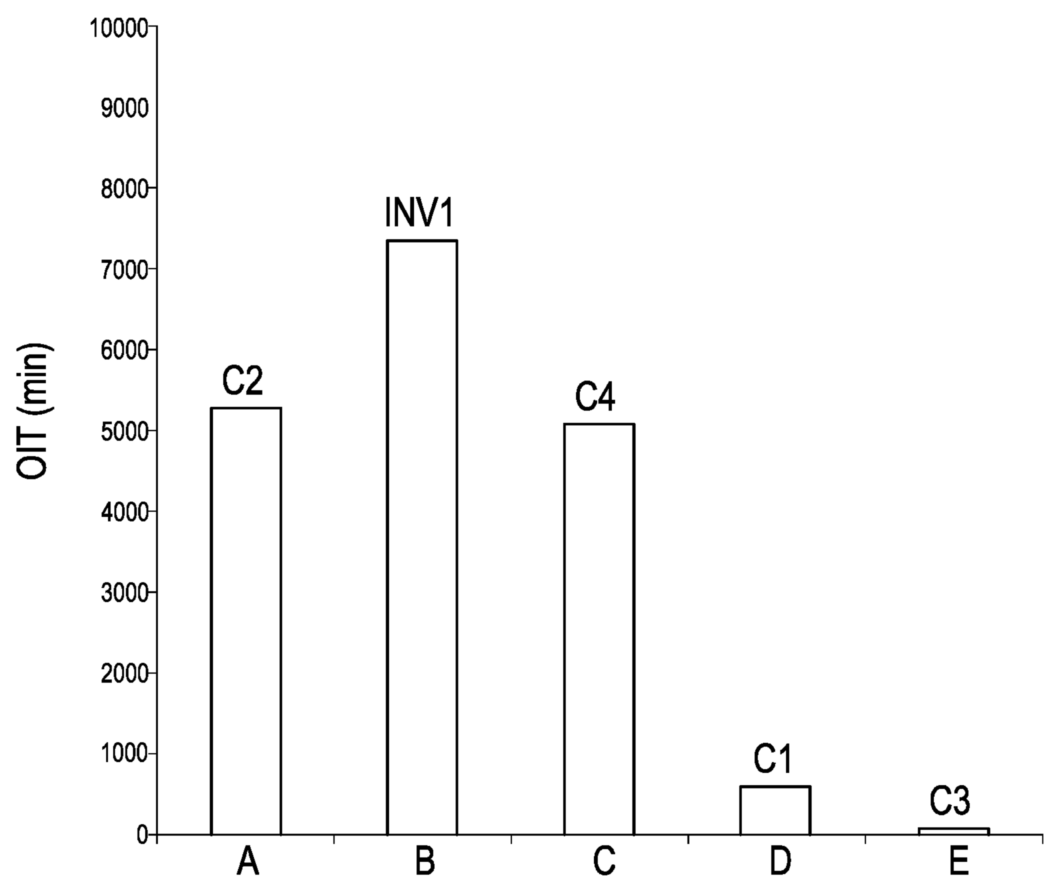
FIG. 8 is a bar graph of the oxidation induction time (OIT) of the comparative samples of non-crosslinkable elastomeric compositions C1, C2, C3, C4, and according to the invention INV1, derived from the results of the chemiluminescence test.

As can be seen in FIG. 8, samples C1 and C3, without protective agents (p-phenylenediamines), show the lowest resistance to oxidation, it was even observed that sample C3 comprising acid AC1 Akypo is worse than sample C1 comprising only the elastomeric material. Samples C2 and C4-comprising 6PPD alone and its adduct with stearic acid, respectively—showed a comparable resistance while sample INV1 behaved unpredictably better, with significantly higher oxidation induction time, exceeding the expectations based on induction times of acid AC1 alone and 6PPD alone (synergistic effect).

Example 3

Preparation of Crosslinkable Elastomeric Compositions for Tyre Sidewall

The comparative crosslinkable elastomeric compositions C5 and C6, comprising 6PPD and the stearate salt of 6PPD (S4) as protecting agents and the compositions according to the invention INV2 and INV3, comprising salt S1 or salt S3, respectively, shown in the following Table 4, were prepared.

TABLE 4

| | Example | | | |
|---|---|---|---|---|
| | 3A | 3B | 3C | 3D |
| | Composition | | | |
| | C5<br>—<br>6PPD | C6<br>S4<br>Stearate<br>6PPD | INV2<br>S1<br>AkypoRLM45CA<br>6PPD | INV3<br>S3<br>AkypoLF2<br>6PPD |
| Ingredients of the first step (phr) | | | | |
| NR | 45.0 | 45.0 | 45.0 | 45.0 |
| BR | 55.0 | 55.0 | 55.0 | 55.0 |
| Stearic acid | 2.0 | 2.0 | 2.0 | 2.0 |
| Zinc oxide | 3.0 | 3.0 | 3.0 | 3.0 |
| TMQ | 0.5 | 0.5 | 0.5 | 0.5 |
| WAX | 2.0 | 2.0 | 2.0 | 2.0 |
| N550 | 45.0 | 45.0 | 45.0 | 45.0 |
| 6PPD | 3.0 | | | |
| Akypo-6PPD (S1) | | | 8.33 | |
| Akypo LF2-6PPD (S3) | | | | 9.10 |
| Stearic acid-6PPD (S4) | | 6.25 | | |
| Ingredients of the second step (phr) | | | | |
| TBBS | 0.9 | 0.9 | 0.9 | 0.9 |
| CTP | 0.2 | 0.2 | 0.2 | 0.2 |
| Sulphur | 2.0 | 2.0 | 2.0 | 2.0 |

wherein NR: natural rubber;

IR: SKI3 GROUP II, Supplier NIZHNEKAMSKNEFTECHIM EXPORT;

BR: cis-1,4-polybutadiene rubber (Europrene® Neocis BR40-Polimeri Europa); Stearic Acid Radiacid 444 (Oleon); Zinc Oxide Zincol Ossidi; TMQ: 2,2,4-trimethyl-1,2-dihydroquinoline Pilnox TDQ, NOCIL; Microcrystalline wax; N550: carbon black N550 OMSK CARBON GROUP; 6PPD: N-(1,3-dimethylbutyl)-N'-phenyl-p-phenylenediamine Santoflex—Solutia Eastman; TBBS (accelerant): N-tertbutyl-2-benzothiazyl-sulphenamide Vulkacit NZ/EG-C, Lanxess; CTP (retardant): N-cyclohexyl-thiophtalimide (Vulkalent®G Lanxess); Zolfo Zolfoindustria.

The amounts of materials (phr) were calculated on the basis of molecular weights: the moles of adduct (S4) of the comparative composition C6 and salts of the compositions according to the invention INV2 and INV3 corresponded to the moles of 6PPD of the comparative composition C5.

All the components, except for sulphur, retardant (CTP) and accelerant (TBBS), were mixed together in an internal mixer (model Pomini PL 1.6) for about 5 minutes (1st step). As soon as the temperature reached 145° C., the elastomeric composition was unloaded. Sulphur, retardant (CTP) and accelerant (TBBS) were then added and further mixing was performed in the same mixer (2nd step) at temperature not exceeding 90° C., followed by final mixing in an open roller mixer.

The results of the static and dynamic property evaluation conducted on compositions C5, C6, INV2 and INV3 are summarised in the following Table 5, where data are normalised to 100 with respect to the values of the reference composition C5:

All samples were subjected to vulcanisation at 170° C. for 10 min.

TABLE 5

| | Composition | | | |
|---|---|---|---|---|
| | C5<br>6PPD | C6<br>S4<br>6PPD<br>stearate | INV2<br>S1 Akypo<br>RLM45CA-<br>6PPD | INV3<br>S3<br>AkypoLF2-<br>6PPD |
| Raw composition properties | | | | |
| Viscosity ML(1 + 4) [%] at 100° C. | 100 | 96 | 77 | 71 |
| Static mechanical properties (23° C.) | | | | |
| Ca0.5 [%] | 100 | 106 | 106 | 100 |
| Ca1 [%] | 100 | 105 | 104 | 99 |
| Ca3 [%] | 100 | 100 | 102 | 85 |
| CR [%] | 100 | 121 | 129 | 106 |
| AR [%] | 100 | 115 | 120 | 120 |
| Dynamic mechanical properties (100 Hz) | | | | |
| E' [%] at 23° C. | 100 | 109 | 103 | 110 |
| Tan Delta [%] 23° C. | 100 | 98 | 98 | 90 |
| E' [%] at 70° C. | 100 | 108 | 101 | 110 |
| Tan Delta [%] 70° C. | 100 | 94 | 95 | 87 |

wherein:

Ca0.5, Ca1, Ca3, CR represent the load for 50%, 100%, 300% elongation and elongation at break expressed in % with respect to the reference C5; AR is the elongation at break (%); E' is the dynamic elastic modulus expressed in % with respect to the reference C5; Tan Delta: loss factor, calculated as the ratio between the dynamic viscous module (E") and the dynamic elastic modulus (E') and expressed in % with respect to reference C5.

From the results shown in Table 5 it can be first observed that the compositions according to the invention INV2 and INV3 have a lower Mooney viscosity than the comparative ones C5 and C6. This greater fluidity translates into an improved processability both during mixing of the elastomeric composition and in the production of semi-finished products.

The static properties as a whole are rather similar in the evaluated samples.

The dynamic characterisation data show no significant differences between the composition according to the invention INV2 and INV3 and the comparative compositions C5 and C6.

Example 4

Preparation of Crosslinkable Elastomeric Compositions for Tyre Sidewall

The comparative crosslinkable elastomeric composition C7, comprising 6PPD along with Melflux as protecting agents, and the compositions according to the invention INV4, INV5 and INV6 comprising S3 and S7, were prepared as shown in the following Table 6.

TABLE 6

| | Example | | | |
|---|---|---|---|---|
| | 4A | 4B | 4C | 4D |
| | Composition | | | |
| | C7 6PPD + Melflux | INV4 S3 | INV5 S7 | INV6 S3 + 6PPD |
| Ingredients of the first step (phr) | | | | |
| NR | 45 | 45 | 45 | 45 |
| BR | 55 | 55 | 55 | 55 |
| Stearic acid | 2 | 2 | 2 | 2 |
| Zinc oxide | 3 | 3 | 3 | 3 |
| TMQ | 0.5 | 0.5 | 0.5 | 0.5 |
| MELFLUX PP100 | 3 | — | — | — |
| N550 | 45 | 45 | 45 | 45 |
| 6PPD | 3 | — | — | 1 |
| Akypo LF2-6PPD (S3) | — | 9.1 | — | 6.1 |
| Akypo LF2-4ADPA (S7) | — | — | 8.16 | — |
| Ingredients of the second step (phr) | | | | |
| TBBS | 0.9 | 0.9 | 0.9 | 0.9 |
| CTP | 0.2 | 0.2 | 0.2 | 0.2 |
| Sulphur | 2 | 2 | 2 | 2 |

NR: natural rubber; IR: SKI3 GRUPPO II Supplier NIZHNEKAMSKNEFTECHIM EXPORT; BR: cis-1,4-polybutadiene rubber (Europrene® Neocis BR40-Polimeri Europa); Stearic Acid Radiacid 444 (Oleon); Zinc Oxide Zincol Ossidi; TMQ: 2,2,4-trimethyl-1,2-dihydroquinoline Pilnox TDQ, NOCIL; Microcrystalline wax; N550: carbon black N550 OMSK CARBON GROUP; 6PPD: N-(1,3-dimethylbutyl)-N'-phenyl-p-phenylenediamine Santoflex—Solutia Eastman; TBBS (accelerant): N-tertbutyl-2-benzothiazyl-sulphenamide Vulkacit NZ/EG-C, Lanxess; CTP (retardant): N-cyclohexyl-thiophtalimide (Vulkalent®G Lanxess); Sulphur Zolfoindustria; Melflux: methacrylic acid copolymer and unsaturated monomers containing polyoxyethylene side chains (BASF).

Formulations C7, INV4, INV6 contain equimolar amounts of PPD, (6PPD total, calculated where applicable by adding salified and free 6PPD).

Formulation INV5 contains 4ADPA (in salified form) in molar amount equivalent to 6PPD of INV4.

The results of the static and dynamic property evaluations of the compositions for sidewall C7, INV4, INV5 and INV6 are summarised in the following Table 7, where data are normalised to 100 with respect to the values of the reference composition C7. The characterisations were performed on samples vulcanised at 170° C. for 10 minutes.

TABLE 7

| | Composition | | | |
|---|---|---|---|---|
| | C7 6PPD + Melflux | INV4 S3 | INV5 S7 | INV6 S3 + 6PPD |
| Raw composition properties | | | | |
| Viscosity ML(1 + 4) [%] at 100° C. | 100 | 70 | 76 | 81 |
| Static mechanical properties (23° C.) | | | | |
| Ca0.5 [%] | 100 | 108 | 112 | 112 |
| Ca1 [%] | 100 | 114 | 114 | 118 |
| Ca3 [%] | 100 | 108 | 97 | 110 |
| CR [%] | 100 | 94 | 81 | 98 |
| AR [%] | 100 | 89 | 89 | 98 |
| Dynamic mechanical properties (100 Hz) | | | | |
| E' [%] at 23° C. | 100 | 97 | 106 | 98 |
| Tan Delta [%] 23° C. | 100 | 92 | 98 | 90 |
| E' [%] at 70° C. | 100 | 98 | 103 | 99 |
| Tan Delta [%] 70° C. | 100 | 92 | 98 | 91 |

wherein:

Ca0.5, Ca1, Ca3, CR represent the load for 50%, 100%, 300% elongation and elongation at break expressed in % with respect to the reference C7; AR is the elongation at break (%); E' is the dynamic elastic modulus expressed in % with respect to the reference C7; Tan Delta: loss factor, calculated as the ratio between the dynamic viscous module (E") and the dynamic elastic modulus (E') and expressed in % with respect to reference C7.

From the results shown in Table 7 it can be first observed that the composition according to the invention INV4, INV5 and INV6 have a lower Mooney viscosity than the comparative ones C7. This greater fluidity translates into an improved processability both during mixing of the elastomeric composition and in the production of semi-finished products.

The static properties as a whole are rather similar in the evaluated samples.

The dynamic characterisation data show no significant differences between the composition according to the invention INV4 and INV6 and the comparative composition C7, while in the case of composition INV5 comprising salt S7 they show values not always comparable, due to the different amine used (4-ADPA).

Assessment of the Ozone Resistance Under Static and Dynamic Conditions

The comparative samples C5, C6, C7 and those according to the invention INV2, INV3 and INV4, INV5 and INV6 were assessed in the ozone resistance tests described above and the results are summarised in the following Tables 8° and 8b:

TABLE 8a

| | Sample | | | |
|---|---|---|---|---|
| | C5<br>—<br>6PPD | C6<br>S4<br>Stearate<br>6PPD | INV2<br>S1<br>Akypo<br>RLM45CA<br>6PPD | INV3<br>S3<br>Akypo<br>LF2<br>6PPD |
| Static ozone test | | | | |
| Score (cracking) | 9 | 5 | 10 | 10 |
| Appearance (spots, oily appearance) | c | c | a | b |
| Dynamic ozone test | | | | |
| Cracks at 1 hour | 0 | 0 | 0 | N/A |
| Cracks at 70 hours | 0 | 0 | 0 | n.d |

n.d.: not detected

TABLE 8b

| | Sample | | | |
|---|---|---|---|---|
| | C7<br>6PPD +<br>Melflux | INV4<br>S3 | INV5<br>S7 | INV6<br>S3 +<br>6PPD |
| Static ozone test | | | | |
| Score (cracking) | 10 | 10 | 9 | 10 |
| Appearance (stains, oily appearance) | a | a | a | a |
| Dynamic ozone test | | | | |
| Cracks at 1 hour | 0 | 0 | 0 | 0 |
| Cracks at 70 hours | 0 | 0 | 0 | 0 |

Key:
Static ozone:
10: no cracks;
0: cracking over the entire surface;
a: stainless;
b: slightly stained;
c: stained;
q: not stained but slightly oily.
Dynamic ozone:
0: no cracks;
4: visible cracks.

The observation of the specimens subjected to static ozone test showed that the sample that contains only 6PPD (C5) had some stains in the central area. Sample C6 containing the adduct of stearic acid with 6PPD (S4) showed a worse resistance to ozone than sample C5 containing 6PPD alone, with longitudinal cracks propagation throughout the central portion of the sample (about 6 cm on a total of 18 cm).

Sample INV2 comprising salt S1 according to the invention instead showed the best performance: not only they did not appear cracked and did not show any signs of wear, but they were also characterised by sheen and smoothness of the surface. Also the sample according to the invention INV3 showed no sign of ageing and had a better surface appearance than the reference.

The observation of the specimens subjected to static ozone test showed that the samples relating to the composition comprising 6PPD (C5) had some stains in the central area. Sample C6 containing the adduct of stearic acid with 6PPD (S4) showed a worse resistance to ozone than sample C5 containing 6PPD alone, with longitudinal cracks propagation throughout the central portion of the sample (about 6 cm on a total of 18 cm).

Sample INV2 comprising salt S1 according to the invention instead showed the best performance: not only it did not appear cracked and did not show any signs of wear, but it was also characterised by sheen and smoothness of the surface. Also the sample according to the invention INV3 showed no sign of ageing and had a better surface appearance than the reference.

The data on the ozone resistance of samples INV4 and INV6 are substantially equivalent to those of the comparative sample C7, while sample INV5 (comprising salt S7-Akypo LF2: 4ADPA) shows a slight surface cracking similar to that of the comparative sample C5 (score 9), but with a better appearance (no stains or opacity).

Without wishing to be bound by any particular interpretation, the Applicant believes that due to the peculiar polyoxyalkylene chain of acid AC, the resulting salt S seems to impart less affinity for the elastomeric matrix to amines AM, thus facilitating and making the surfacing thereof uniform. This would result in the excellent appearance of the surfaces of tyre components, particularly the sidewalls, surfaces that have stains or discolorations even in the long term.

The dynamic ozone test showed that excellent levels of antiozonant activity was maintained for the samples according to the invention that are comparable to those of 6PPD.

The observation of the specimens in fact shows no significant differences between the comparative samples C5, C6 and C7 and the invention INV2, INV4, INV5 and INV6 (no cracks, score 0, very good).

The excellent results shown by the samples according to the invention in static ozone and dynamic ozone tests are predictive of an excellent anti-degradation action in the tyre.

In conclusion, the elastomeric compositions according to the invention have many advantages over similar known compositions, in particular they are characterised by excellent antioxidant and antiozonant performance, possibly allowing the use of waxes and further antioxidants to be reduced or prevented, have and maintain a considerably better appearance at a surface level over time as they are free from colouring and whitish spots, have comparable or improved mechanical properties, raw are less viscous and therefore easier to be processed both during the mixing step and in the production of semi-finished products, during the preparation they show negligible volatile anti-ozonant amine emissions due to the stability of the present salts, with considerable environmental advantages, health of the operators, reproducibility of the incorporation process and dosage of the amines. Moreover, the preparation of salts is particularly simple, easily industrialised and eco-friendly as it does not require the use of solvents, does not generate by-products and does not require purification. Finally, the acids used in the preparation of the present salts are poorly harmful and readily available on the market.

The invention claimed is:

1. A salt S comprising:

i) at least one acid AC of formula (I)

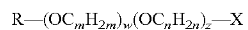

$$R—(OC_mH_{2m})_w(OC_nH_{2n})_z—X \quad (I)$$

wherein

R is chosen from H, linear or branched $C_1$-$C_{22}$ alkyl groups, $C_6$-$C_{20}$ aryl or aralkyl groups, and mixtures thereof, groups $—(OC_mH_{2m})_w$ and $(OC_nH_{2n})_z$ are chosen from linear or branched polyoxyalkylene groups, wherein m and n are independently chosen from an integer ranging from 2 to 5 and w and z are independently chosen from an integer ranging from 0 to 20, wherein the sum of w and z is an integer ranging from 1 to 40, X is a group chosen from —O—R1-COOH, —S—R1-COOH, —NR2-R1-COOH, —P(═O)OR3OR4, —O—P(═O)OR3OR4, —O—PO3H, and —O—R1-P(═O)OR3OR4, wherein R1 is chosen from linear or branched $C_1$-$C_4$ alkylene groups, and $C_6$-$C_{20}$ aryl or aralkyl groups, R2 is chosen from H, —R, and —C(═O)R, wherein R is a group as defined above, and at least one of R3 and R4 is H and the other is chosen from H and R—$(OC_mH_{2m})_w$ $(OC_nH_{2n})_z$— as defined above; and ii) at least one amine AM of formula (II)

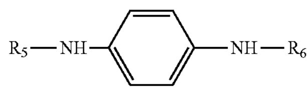

(II)

wherein

R5 and R6 are independently chosen from H, saturated or unsaturated linear or branched $C_2$-$C_{22}$ alkyl groups, $C_4$-$C_{10}$ cycloalkyl groups, and $C_6$-$C_{20}$ aryl and aralkyl groups, at least one of R5 and R6 is other than H.

2. The salt S according to claim 1, wherein the acid AC is an acid of formula (I), wherein X is O—$CH_2$—COOH, R is chosen from unsubstituted $C_4$-$C_{14}$ alkyl groups, m is 2, z is 0, and w is chosen from an integer ranging from 1 to 10.

3. The salt S according to claim 1, wherein the amine AM is an amine of formula (II), wherein R5 is phenyl and R6 is hydrogen.

4. The salt S according to claim 1, wherein the acid AC is an acid of formula (I), wherein X is O—$CH_2$—COOH and is present in a molar ratio ranging from about 0.7:1 to about 1:1 with respect to the amine AM.

5. The salt S according to claim 1, wherein the acid AC has a pKa value ranging from 4.0 to 1.5.

6. The salt S according to claim 5, wherein the acid AC has a pKa value ranging from 4.0 to 2.5.

7. The salt S according to claim 1, wherein the amine AM is an amine of formula (II), wherein R5 and R6 are both other than H.

8. The salt S according to claim 7, wherein R5 and R6 are both other than H and one of R5 and R6 is phenyl.

9. The salt S according to claim 1, wherein R5 is phenyl and R6 is 1,3-dimethyl-butyl.

10. The salt S according to claim 1, wherein the acid AC is an acid of formula (I), wherein R is chosen from linear or branched $C_4$-$C_{18}$ alkyl groups, $C_6$-$C_{12}$ aryl or aralkyl groups, and mixtures thereof, m and n are independently chosen from an integer ranging from 2 to 4, and X is a group chosen from —O—R1-COOH, —O—P(═O)OR3OR4, and —O—$PO_3H$, wherein R1 is chosen from $C_1$-$C_2$ alkylene groups and at least one of R3 and R4 is H and the other is chosen from H and R—$(OC_mH_{2m})_w(OC_nH_{2n})_z$—, wherein R, m, n, w and z are as defined herein.

11. The salt S according to claim 10, wherein w and z are independently chosen from an integer ranging from 0 to 10 and the sum of which is an integer ranging from 1 to 10.

12. The salt S according to claim 10, wherein

R is chosen from linear or branched $C_6$-$C_{14}$ alkyl groups, m is 2, w is chosen from an integer ranging from 1 to 10, z is 0, and X is a group —O—R1-COOH, wherein R1 is chosen from unsubstituted $C_1$-$C_2$ alkylene groups, and mixtures thereof.

13. An elastomeric composition comprising:

at least 100 phr of at least one diene elastomeric polymer, at least one salt S comprising:

i) at least one acid AC of formula (I)

$$R—(OC_mH_{2m})_w(OC_nH_{2n})_z—X \quad (I)$$

wherein

R is chosen from H, linear or branched $C_1$-$C_{22}$ alkyl groups, $C_6$-$C_{20}$ aryl or aralkyl groups, and mixtures thereof, groups —$(OC_mH_{2m})_w$ and $(OC_nH_{2n})_z$ are chosen from linear or branched polyoxyalkylene groups, wherein m and n are independently chosen from an integer ranging from 2 to 5 and w and z are independently chosen from an integer ranging from 0 to 20, wherein the sum of w and z is an integer ranging from 1 to 40, X is a group chosen from —O—R1-COOH, —S—R1-COOH, —NR2-R1-COOH, —P(═O)OR3OR4, —O—P(═O)OR3OR4, —O—PO3H, and —O—R1-P(═O)OR3OR4, wherein R1 is chosen from linear or branched $C_1$-$C_4$ alkylene groups, and $C_6$-$C_{20}$ aryl or aralkyl groups, R2 is chosen from H, —R, and —C(═O)R, wherein R is a group as defined above, and at least one of R3 and R4 is H and the other is chosen from H and R—$(OC_mH_{2m})_w$ $(OC_nH_{2n})_z$— as defined above; and ii) at least one amine AM of formula (II)

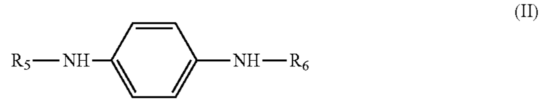

(II)

wherein

R5 and R6 are independently chosen from H, saturated or unsaturated linear or branched $C_2$-$C_{22}$ alkyl groups, $C_4$-$C_{10}$ cycloalkyl groups, and $C_6$-$C_{20}$ aryl and aralkyl groups, at least one of R5 and R6 is other than H, in an amount comprising at least 0.1 phr of the amine AM (II), and at least 1 phr of a reinforcement filler.

14. The elastomeric composition according to claim 13, further comprising at least 0.5 phr of a vulcanizing agent.

15. The elastomeric composition according to claim 13, wherein in addition to the amine AM contained in the salt S, at least 0.1 phr of another amine AM of formula (II) is present.

16. A tyre component comprising:

an elastomeric composition comprising at least 100 phr of at least one diene elastomeric polymer, at least one salt S comprising:

i) at least one acid AC of formula (I)

$$R—(OC_mH_{2m})_w(OC_nH_{2n})_z—X \quad (I)$$

wherein

R is chosen from H, linear or branched $C_1$-$C_{22}$ alkyl groups, $C_6$-$C_{20}$ aryl or aralkyl groups, and mixtures thereof, groups —$(OC_mH_{2m})_w$ and $(OC_nH_{2n})_z$ are chosen from linear or branched polyoxyalkylene groups, wherein m and n are independently chosen from an integer ranging from 2 to 5 and w and z are independently chosen from an integer ranging from 0 to 20, wherein the sum of w and z is an integer ranging from 1 to 40, X is a group chosen from —O—R1-COOH, —S—R1-COOH, —NR2-R1-COOH, —P(=O)OR3OR4, —O—P(=O)OR3OR4, —O—PO3H, and —O—R1-P(=O)OR3OR4, wherein R1 is chosen from linear or branched $C_1$-$C_4$ alkylene groups, and $C_6$-$C_{20}$ aryl or aralkyl groups, R2 is chosen from H, —R, and —C(=O)R, wherein R is a group as defined above, and at least one of R3 and R4 is H and the other is chosen from H and R—$(OC_mH_{2m})_w$ $(OC_nH_{2n})_z$— as defined above; and ii) at least one amine AM of formula (II)

(II)

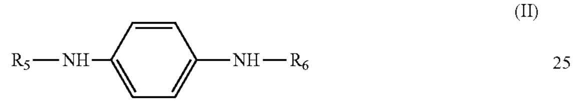

wherein

R5 and R6 are independently chosen from H, saturated or unsaturated linear or branched $C_2$-$C_{22}$ alkyl groups, $C_4$-$C_{10}$ cycloalkyl groups, and $C_6$-$C_{20}$ aryl and aralkyl groups, at least one of R5 and R6 is other than H, in an amount comprising at least 0.1 phr of the amine AM (II), and at least 1 phr of a reinforcement filler.

17. The tyre component according to claim 16, wherein the tyre component is chosen from tread, pair of sidewalls, and anti-abrasive layer.

18. A tyre for vehicle wheels comprising at least one tyre component comprising an elastomeric composition obtained by vulcanization of an elastomeric composition comprising:

at least 100 phr of at least one diene elastomeric polymer, at least one salt S comprising:

i) at least one acid AC of formula (I)

$$R—(OC_mH_{2m})_w(OC_nH_{2n})_z—X \quad (I)$$

wherein

R is chosen from H, linear or branched $C_1$-$C_{22}$ alkyl groups, $C_6$-$C_{20}$ aryl or aralkyl groups, and mixtures thereof, groups —$(OC_mH_{2m})_w$ and $(OC_nH_{2n})_z$ are chosen from linear or branched polyoxyalkylene groups, wherein m and n are independently chosen from an integer ranging from 2 to 5 and w and z are independently chosen from an integer ranging from 0 to 20, wherein the sum of w and z is an integer ranging from 1 to 40, X is a group chosen from —O—R1-COOH, —S—R1-COOH, —NR2-R1-COOH, —P(=O)OR3OR4, —O—P(=O)OR3OR4, —O—PO3H, and —O—R1-P(=O)OR3OR4, wherein R1 is chosen from linear or branched $C_1$-$C_4$ alkylene groups, and $C_6$-$C_{20}$ aryl or aralkyl groups, R2 is chosen from H, —R, and —C(=O)R, wherein R is a group as defined above, and at least one of R3 and R4 is H and the other is chosen from H and R—$(OC_mH_{2m})_w$ $(OC_nH_{2n})_z$— as defined above; and ii) at least one amine AM of formula (II)

(II)

R5—NH NH—R6 wherein

R5 and R6 are independently chosen from H, saturated or unsaturated linear or branched $C_2$-$C_{22}$ alkyl groups, $C_4$-$C_{10}$ cycloalkyl groups, and $C_6$-$C_{20}$ aryl and aralkyl groups, at least one of R5 and R6 is other than H, in an amount comprising at least 0.1 phr of the amine AM (II), and at least 1 phr of a reinforcement filler.

19. The tyre according to claim 18, wherein the tyre component is chosen from tread, pair of sidewalls, and anti-abrasive layer.

20. The tyre according to claim 18, wherein the tyre is for a vehicle chosen from motorcycles, heavy load vehicles, and motor vehicles.

* * * * *